US010007296B2

(12) United States Patent
Hume

(10) Patent No.: US 10,007,296 B2
(45) Date of Patent: Jun. 26, 2018

(54) RECONFIGURABLE COMPUTER DOCKING STATION

(76) Inventor: David Hume, South San Francisco, CA (US)

(*) Notice: Subject to any disclaimer, the term of this patent is extended or adjusted under 35 U.S.C. 154(b) by 916 days.

(21) Appl. No.: 13/589,136

(22) Filed: Aug. 18, 2012

(65) Prior Publication Data

US 2014/0049904 A1   Feb. 20, 2014

(51) Int. Cl.
| G06F 13/00 | (2006.01) |
| G06F 1/16 | (2006.01) |
| H01R 25/00 | (2006.01) |
| H01R 25/14 | (2006.01) |
| H01R 31/06 | (2006.01) |

(52) U.S. Cl.
CPC ......... *G06F 1/1632* (2013.01); *H01R 25/006* (2013.01); *H01R 25/142* (2013.01); *H01R 31/06* (2013.01); *H01R 2201/06* (2013.01); *Y10T 29/49204* (2015.01)

(58) Field of Classification Search
CPC .................................................... G06F 1/1632
USPC ........................................................ 710/304
See application file for complete search history.

(56) References Cited

U.S. PATENT DOCUMENTS

| 5,737,541 | A | * | 4/1998 | Shimizu | G06F 1/1632 |
| | | | | | 361/679.41 |
| 5,784,253 | A | * | 7/1998 | Ooka | G06F 1/1632 |
| | | | | | 361/679.43 |
| 6,142,593 | A | * | 11/2000 | Kim | G06F 1/1632 |
| | | | | | 312/223.2 |
| 6,188,572 | B1 | * | 2/2001 | Liao | G06F 1/1632 |
| | | | | | 312/223.1 |
| 6,396,687 | B1 | * | 5/2002 | Sun | G06F 1/1632 |
| | | | | | 312/223.2 |
| 6,683,786 | B2 | * | 1/2004 | Yin | G06F 1/1632 |
| | | | | | 361/679.4 |
| 7,128,608 | B1 | * | 10/2006 | Chen | H01R 13/405 |
| | | | | | 439/607.53 |
| 7,488,215 | B2 | * | 2/2009 | Mayette | H01R 13/6315 |
| | | | | | 439/171 |
| 7,511,954 | B2 | * | 3/2009 | Tsai | G06F 1/1632 |
| | | | | | 361/679.41 |
| 7,540,748 | B2 | * | 6/2009 | Tracy | G06F 1/1616 |
| | | | | | 439/131 |
| 8,179,672 | B2 | * | 5/2012 | Carnevali | G06F 1/1632 |
| | | | | | 361/679.41 |
| 8,649,169 | B2 | * | 2/2014 | Kwon | G06F 1/1632 |
| | | | | | 361/679.41 |
| 8,659,889 | B2 | * | 2/2014 | Dolci | G06F 1/1632 |
| | | | | | 361/679.41 |
| 8,780,546 | B2 | * | 7/2014 | Zhou | H01R 27/00 |
| | | | | | 361/679.41 |

(Continued)

*Primary Examiner* — Faisal M Zaman
(74) *Attorney, Agent, or Firm* — Patrick Reilly

(57) ABSTRACT

A method and system for adaptively docking with computers of different designs are provided. In one version, an electrical communications connector (hereinafter, "docking connector") is coupled with a docking station frame, wherein the docking connector may be positioned relative to the frame. A computer having a native connector may be positioned relative to the frame, and the docking connector may be positioned relative to both the frame and the computer to permit communicative coupling of the docking connector and the native connector of the computer.

5 Claims, 29 Drawing Sheets

(56) References Cited

U.S. PATENT DOCUMENTS

| | | | | |
|---|---|---|---|---|
| 8,821,173 B2* | 9/2014 | Carnevali | ............. | G06F 1/1632 361/679.41 |
| 8,926,349 B2* | 1/2015 | Carnevali | ............. | G06F 1/1626 439/170 |
| 9,042,087 B2* | 5/2015 | Hung | .................... | G06F 1/1626 248/229.22 |
| 9,075,573 B2* | 7/2015 | Hayashida | ............ | G06F 1/1632 |
| 2001/0022574 A1* | 9/2001 | Hwang | .................... | G10H 1/00 345/156 |
| 2003/0030412 A1* | 2/2003 | Matsuda | ................. | G06F 1/263 320/127 |
| 2006/0056401 A1* | 3/2006 | Bohm | ................. | G06F 13/4022 370/360 |
| 2007/0133207 A1* | 6/2007 | Pryor | .................... | H01R 25/147 362/253 |
| 2007/0263348 A1* | 11/2007 | Rutledge | ................. | G06F 1/263 361/679.01 |
| 2008/0168519 A1* | 7/2008 | Rao | ............................ | G06F 3/14 725/127 |
| 2009/0056186 A1* | 3/2009 | Pitcher | ..................... | G09F 7/18 40/617 |
| 2009/0073642 A1* | 3/2009 | Jubelirer | ............... | G06F 1/1632 361/679.01 |
| 2009/0130874 A1* | 5/2009 | Englund | .............. | H01R 13/645 439/131 |
| 2009/0168312 A1* | 7/2009 | Motoe | ................... | G06F 1/1632 361/679.01 |
| 2009/0174998 A1* | 7/2009 | Struthers | ................ | H04H 20/63 361/679.41 |
| 2010/0118193 A1* | 5/2010 | Boyden | .................. | G09G 5/006 348/554 |
| 2010/0138581 A1* | 6/2010 | Bird | ........................ | H04L 65/60 710/303 |
| 2010/0150572 A1* | 6/2010 | Lee | ........................ | G06F 13/409 398/141 |
| 2011/0095976 A1* | 4/2011 | Hwang | ................. | G06F 1/1622 345/156 |
| 2013/0005179 A1* | 1/2013 | Aldana | ............. | H01R 13/6315 439/529 |
| 2013/0050932 A1* | 2/2013 | Williams | ............... | G06F 1/1632 361/679.41 |
| 2013/0080713 A1* | 3/2013 | Steinhilber | .......... | G11B 23/049 711/154 |
| 2013/0225096 A1* | 8/2013 | Elter | ....................... | H04M 1/72 455/74.1 |
| 2014/0232343 A1* | 8/2014 | Tadd | .................... | H02J 7/0042 320/114 |

* cited by examiner

Figure 25
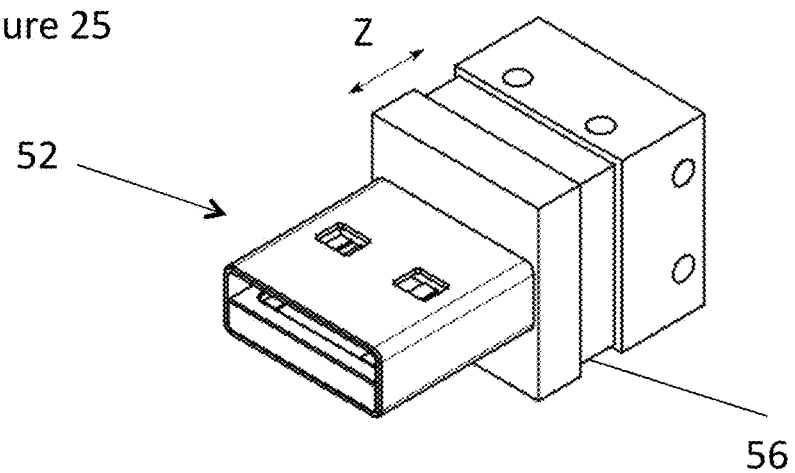
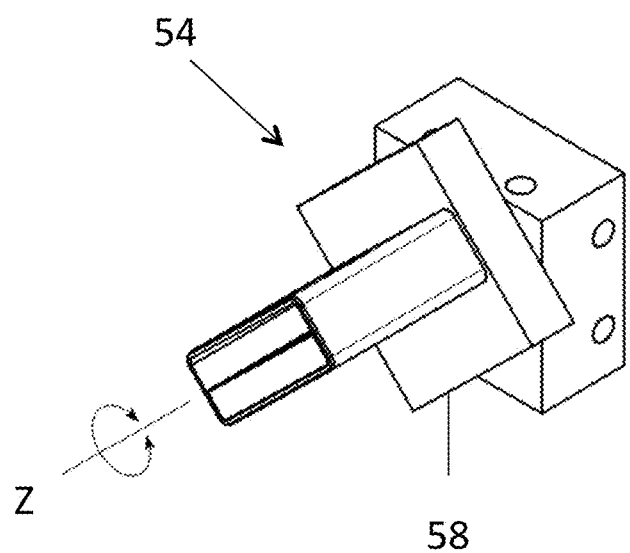

RECONFIGURABLE COMPUTER DOCKING STATION

FIELD OF THE INVENTION

The present invention relates to computer technology. More particularly, the present invention relates to docking systems adapted to support communicative coupling with computational systems, including tablet computers, laptop computers, desktop computers, and mainframe computers.

BACKGROUND OF THE INVENTION

A wide diversity of computer models are becoming increasingly ubiquitous in business environments and consumer applications. Various prior art docking systems are available wherein each docking system model is adapted to optimally support a single computer model or family of computers provided by a same vendor or manufacturer. In particular, many prior art docking system models are adapted for coupling with only a particular make and model of computer, such as a specific model or product family of portable computers, laptop computers, desktop computers or mainframe computers.

It is understood that the term portable computer is defined herein to include digital cellular telephones, lap top computers and tablet computers. More particularly, examples of portable computers include (a.) an IPHONE™ cellular telephone as marketed by Apple, Inc. of Cupertino; (b.) an IPAD™ tablet computer adapted for generation of digitized photographic documents and capable of bi-directional communications via the telephony network and the Internet 6 as marketed by Apple, Inc. of Cupertino, Calif.; (c.) an HTC TITAN II™ cellular telephone as marketed by AT&T, Inc. of Dallas, Tex. and running a WINDOWS 7™ operating system as marketed by Microsoft Corporation of Redmond, Wash.; (d.) a GALAXY NEXUS™ smart phone as marketed by Samsung Group of Seoul, Republic of Korea and running an ANDROID™ operating system as marketed by Google, Inc. of Mountain View, Calif.; (e) a TOUGHPAD™ tablet computer as marketed by Panasonic Corporation of Kadoma, Osaka, Japan and running an ANDROID™ operating system as marketed by Google, Inc. of Mountain View, Calif.; or (f.) other suitable manually portable computational system or electronic communications device known in the art.

Reducing the complexity of portable computers enables cost reductions and reductions in weight in such systems, to include tablet computers and laptop computers. This major trend in portable computer design increases the value and utility of temporarily coupling tablet and lap top computers to docking stations by providing access to useful external peripherals, such as expanded video display screen modules, memory storage modules, and disc memory readers, players and writers.

Many consumers and business owners possess or use two or more portable computers, wherein each portable computer module presents differing external locations of interface connectors. Yet most prior art docking stations are designed and adapted to physically support, communicatively couple with, and provide electrical power to, a particular computer model or set of systems marketed by a same corporation or vendor. More particularly, a given docking station designed to support a first computer model is typically incapable of physically supporting, communicatively coupling with, and/or providing electrical power to a second computer model provided by an alternate computer manufacturer of vendor.

There is therefore a long felt need to provide an improved docking station that presents plugs and/or connectors that may be coupled to a docking station wherein one or more plugs or connectors of the docking station can be positioned relative to a frame of the docking station to enable communicative coupling with different models of computers.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Patent application, Publication No. 2010/0118193 (Inventors: Boyden et al.), titled "HDMI Switching Technology For The Couples of Consumer Electronic Control And/Or Non-Consumer Electronic Control Devices in an Audio/Visual Environment"; U.S. Patent Application, Publication No. 2008/0168519 (Inventors: Tandhoni S. Rao et al.), titled "System, Method And Apparatus For Connecting Multiple Audio/Visual Sources to An Audio/Visual Sink"; and U.S. Patent application, Publication No. 2006/0056401 (Inventors: Bohm et al.), titled "Peripheral Sharing USB Hub."

The publications discussed or mentioned herein are provided solely for their disclosure prior to the filing date of the present application. Nothing herein is to be construed as an admission that the present invention is not entitled to antedate such publication by virtue of prior invention.

SUMMARY AND OBJECTS OF THE INVENTION

Toward this and other objects that are made obvious in light of the disclosure, a method and docking system are provided for communicatively coupling a computer with one or more electrically conductive elements. According to a first aspect of the method of the present invention, an electrical communications connector (hereinafter, "docking connector") is coupled with a docking station frame, wherein the docking connector may be positioned relative to the frame. A computer having a native connector may be positioned relative to the frame, and the docking connector may be positioned relative to both the frame and the computer to permit communicative coupling of the docking connector and the native connector of the computer.

According to a second aspect of the method of the present invention, the invented docking station may be adapted to support and communicatively couple with a portable computer.

According to a third aspect of the method of the present invention, the invented docking station may be adapted to position the docking connector along a single axis, along an arc, and/or within a two dimensional plane, wherein the docking connector is positionable to enable engagement with the native connector of the computer.

According to a fourth aspect of the method of the present invention, the docking connector may comprise a removable adapter, wherein two or more designs of adapters may be removably and alternately positioned within the invented docking station to establish a structure of the docking connector that is complementary with the native connector.

BRIEF DESCRIPTION OF THE FIGURES

These, and further features of the invention, may be better understood with reference to the accompanying specification and drawings depicting the preferred embodiment, in which:

FIG. 25 is perspective view of a fourth and fifth USB insertion plug;

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events that is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
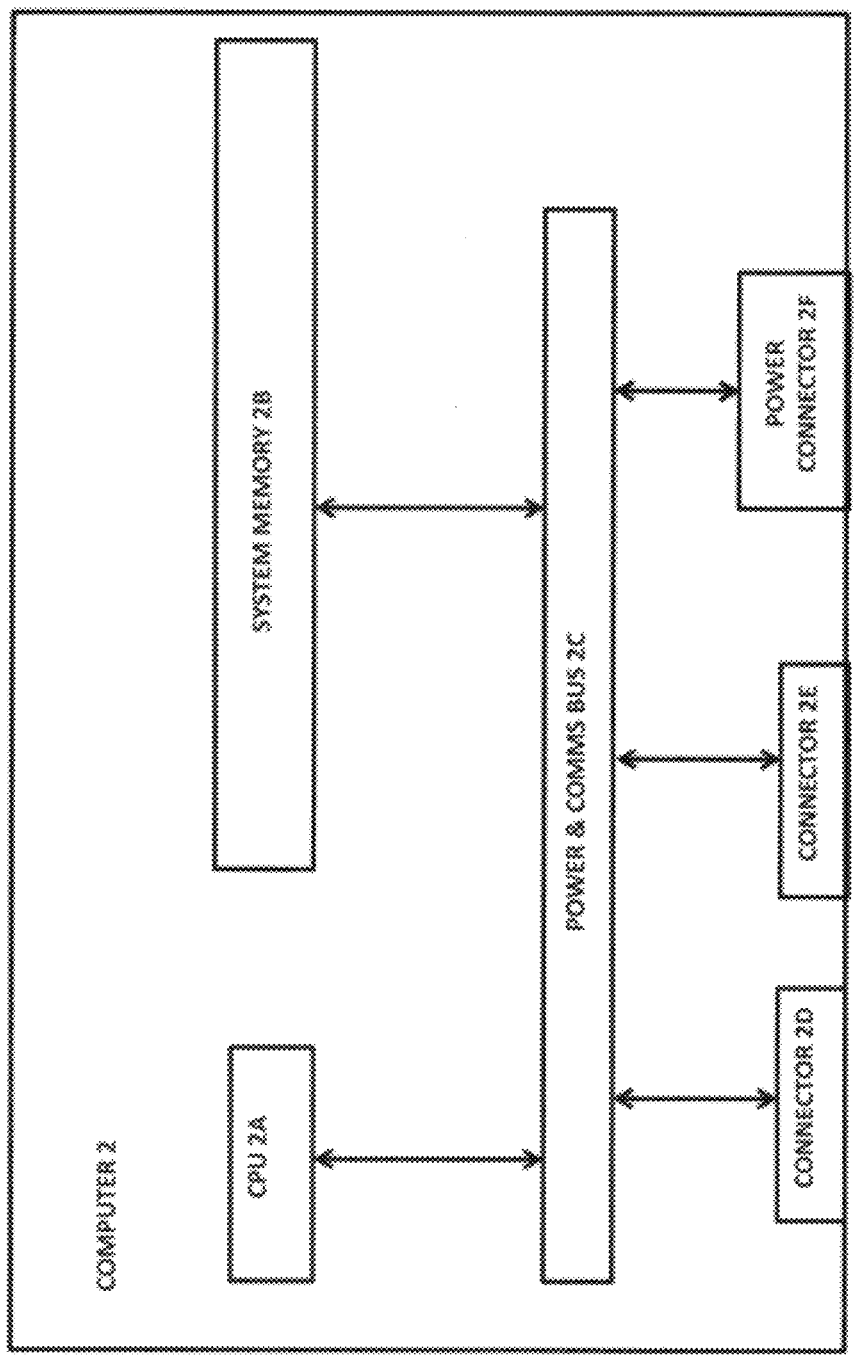
FIG. 1 is a schematic of an exemplary portable computer.

FIG. 1 is a schematic of an exemplary computer 2. It is understood that the computer 2 may be a portable computer, a supercomputer, a mainframe computer, a midrange computer or a minicomputer, a server, a workstation, a digital telephone, an eBook reader, a personal digital assistant, or a portable computer.

A central processing unit 2A and a system memory 2B are bi-directionally communicatively coupled with an internal power and communications bus 2C. A first connector 2D, a second connector 2E and a power source connector 2F are additionally bi-directionally communicatively coupled with an internal power and communications bus 2C. Either of the connectors 2D & 2E may be an industry standard communications connector receptacle or port, such as a component conforming to a receptacle specification of (a.) a Universal Serial Bus (hereinafter, "USB") connector specification, such the USB 1.0, USB 1.1, USB 2.0 or USB 3.0 receptacle specification; (b.) a High-Definition Multimedia Interface (hereinafter, "HDMI") connector specification, such as the HDMI Version 1.0, 1.2, 1.3 or 1.4; (c.) a suitable proprietary USB format such as the 30-pin plug marketed by Apple Inc. of Cupertino, Calif. or the 60-pin plug marketed by ASUS-Tek of Taipei, Taiwan; or (d.) other suitable electrical device communications and power connector specifications known in the art. Optionally, the power source connector 2F and the first and second connectors 2D, 2E could be integrated into the same connector. Such would be the case where USB connectors where used which have a dedicated pin for power transfer.

Figure 2:
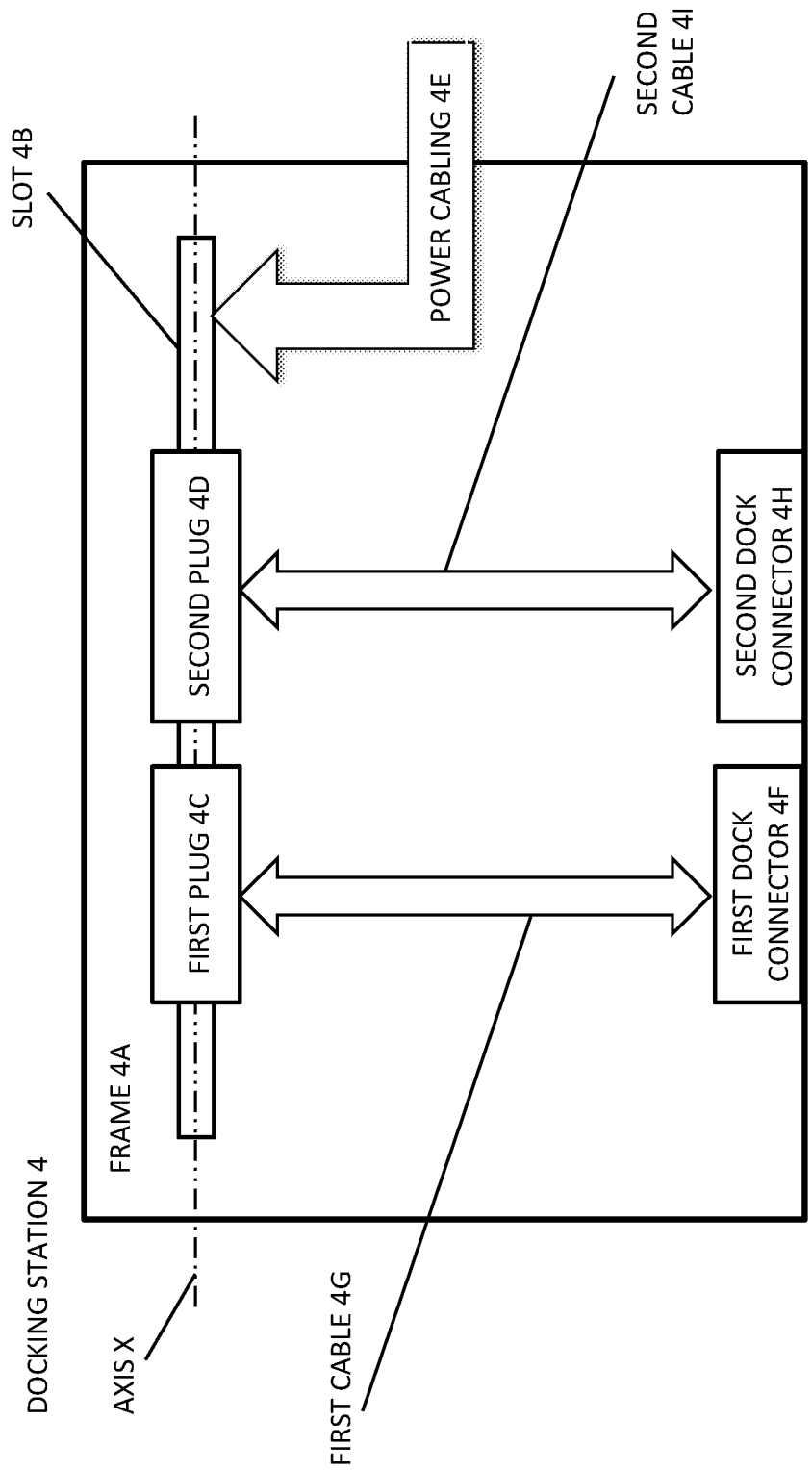
FIG. 2 is a simplified schematic of a first invented docking station having a frame that defines a slot.

FIG. 2 is a simplified schematic of a first invented docking station 4 (hereinafter, "first station" 4). The first station 4 is shaped, structured and adapted to (a.) bi-directionally communicatively couple with the computer 2; (b.) couple with the computer 2 and provide electrical power or an electrical power pathway to the computer 2; (c.) physically or mechanical at least partially support or bear the weight of the computer 2; and/or (d.) enable the user to position the computer 2 while the computer 2 is coupled with the first dock 4.

The first dock includes a frame 4A that defines a slot 4B. A first plug 4C, a second plug 4D and a power cabling 4E are slideably connected with the frame 4A by positioning within the slot 4B and along a first lateral X axis. It is understood that the slot 4B may be partially or entirely arcuate or curved. Alternatively, power cabling 4E may be connected to internal components 3 (not shown). The first plug 4C is bi-directionally communicatively coupled with a first dock connector 4F by means of a first dock cable 4G. The second plug 4D is bi-directionally communicatively coupled with a second dock connector 4H by means of a second dock cable 4I. In this figure, the dock cables 4G and 4I can either literally be cables, or simply be viewed as showing communicative coupling between elements by suitable means known in the art.

The first plug 4C and/or the second plug 4D may conform to an industry standard communications connector plug specification such as (a.) a Universal Serial Bus (hereinafter, "USB") connector specification, such the USB 1.0, USB 1.1, USB 2.0 or USB 3.0 receptacle specification; (b.) a High-Definition Multimedia Interface (hereinafter, "HDMI") connector specification, such as the HDMI Version 1.0, 1.2, 1.3 or 1.4; (c.) a suitable proprietary USB format such as the 30-pin plug marketed by Apple Inc. of Cupertino, Calif. or the 60-pin plug marketed by ASUSTek of Taipei, Taiwan; or (d.) other suitable electrical device communications and power connector specifications known in the art.

Either of the dock connectors 4F & 4H may conform to an industry standard communications connector receptacle or port specification such as (a.) a Universal Serial Bus (hereinafter, "USB") connector specification, such the USB 1.0, USB 1.1, USB 2.0 or USB 3.0 receptacle specification; (b.) a High-Definition Multimedia Interface (hereinafter, "HDMI") connector specification, such as the HDMI Version 1.0, 1.2, 1.3 or 1.4; or (c.) other suitable electrical device communications and power connector specifications known in the art.

The first plug 4C and the second plug 4D are reconfigurable elements of the docking station 4, wherein the first plug 4C and the second plug 4D may (a.) be swapped out entirely and replaced with an alternate plug 4A or 4D; and/or (b.) reconfigured by replacing a plug element of a plug 4A or 4D with an alternate element that supports a complementary configuration of the instant reconfigured plug 4A or 4D with an alternate connector standard. For example, the first plug 4C might enable communicative and power coupling according to a USB standard and the second plug 4D might enable communicative and power coupling according to an HDMI standard, and these plugs might be reconfigured by swapping in and out the slot 48 at different locations within the slot 48. It is understood that the partially or entirely removable, replaceable, reconfigurable and swappable frame components and plug elements include, but are not limited to, first the plug 4C, second plug 4D, First cable 4G, second cable 4I, first dock connector 4f, and second dock connector 4H.

It is further understood that the scope of meaning of the term "complementary" as used in this disclosure includes the quality of a connector 2D, 2E, 4C, 4D, 4F, & 4H, and the structure and design thereof, to effectively and/or fully enable coupling with another connector 2D, 2E, 4C, 4D, 4F, & 4H and when coupled provide (a.) mechanical coupling; (b.) unidirectional and/or bi-directional signal transference and communication; and/or (c.) power signal transference.

Figure 3:
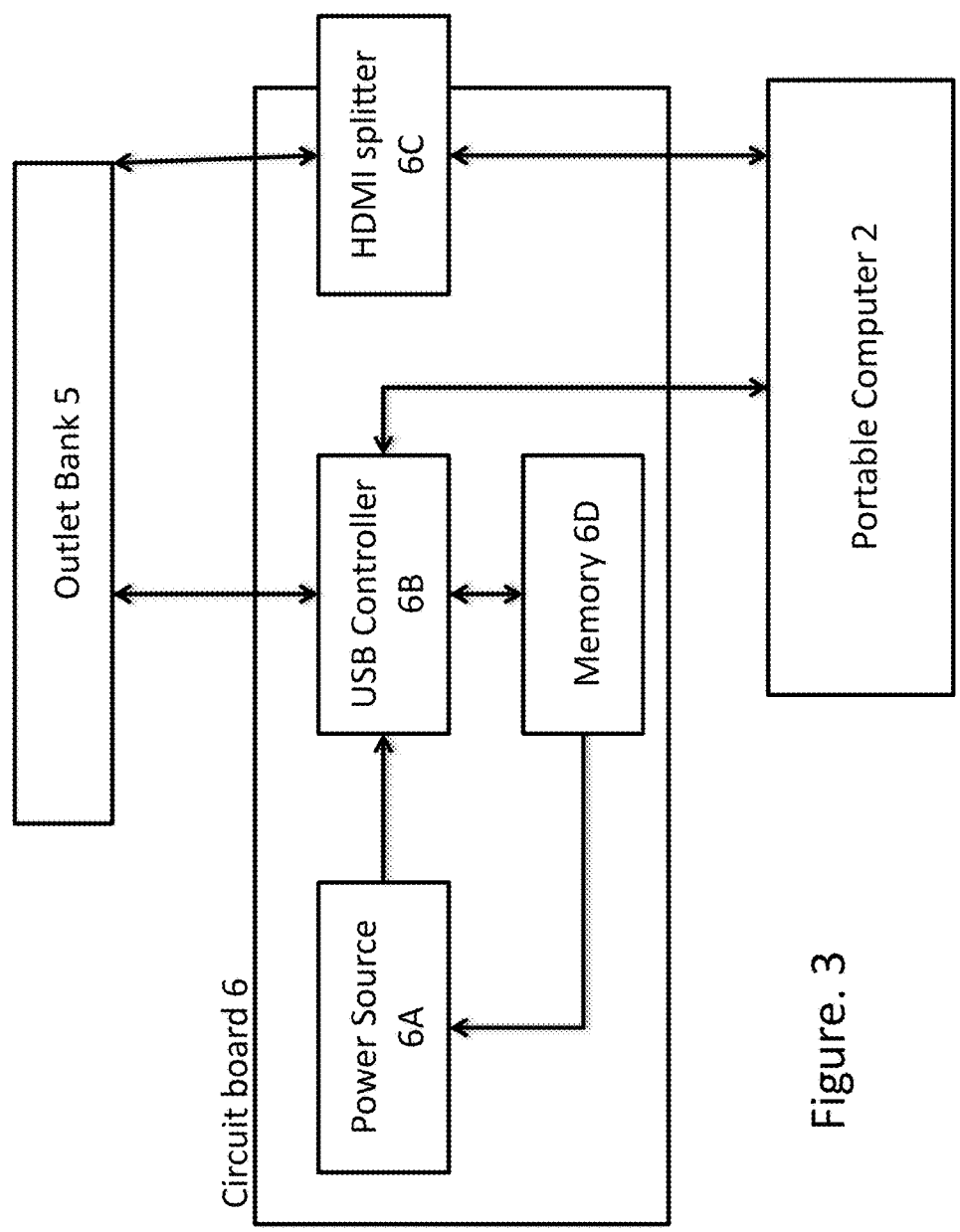
FIG. 3 is a schematic diagram of internal components of invented docking stations.

FIG. 3 is a schematic of internal components 3 of an invented docking station. FIG. 3 further details how additional peripherals may be linked to the invented docking station. Inside the frame 4A of the first station 4, is a circuit board 6. The circuit board 6 includes a power source 6A. The power source 6A connects to the power cabling 4E, which in turn plugs into a standard wall outlet. The power source 6A provides power to components of the first station 4 as well as a coupled computer 2 at an acceptable voltage. Additionally on the circuit board 6, is a USB controller 6B. The USB controller 6B functions like a USB hub device. Various USB hub devices are known. The USB controller 6B communicates with an outlet bank of plugs 5 ("outlet bank 5") that allow a set of peripheral devices to be connected. Dock connectors 4F and 4H would be included in the outlet bank 5 along with a plurality of other connectors of varying size and type in order to accommodate all common peripheral devices. The USB controller 6B further communicates with the computer 2 via a first plug 4C. The circuit board 6 may optionally include a memory 6D. The memory may contain firmware designed for various kinds of portable computers 2 that can be pushed to the computer 2 via the USB controller 6B and the first plug 4C and facilitate communication between the computer 2 and any peripherals plugged into the outlet bank 5. Additionally, the circuit board 3 includes a HDMI switch 6C. Various HDMI switches are known. The HDMI switch 6C is connected to the outlet bank 5 where the outlet bank 5 provides multiple types of suitable plugs for various multimedia peripherals. The HDMI switch further communicates with the computer 2 via a second plug 4D.

Figure 4:
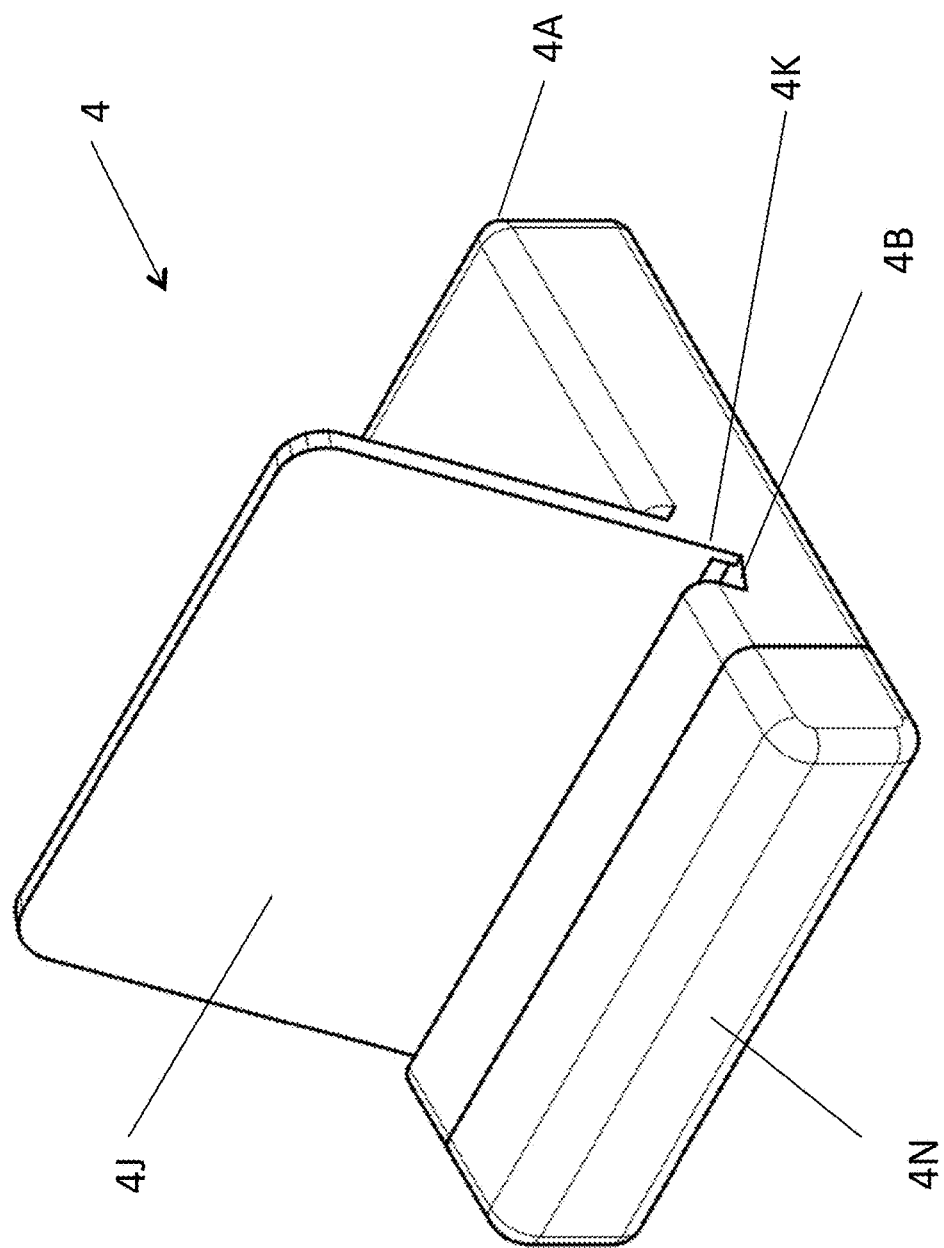
FIG. 4 is a perspective view of the first station of FIG. 2 wherein a support plate of the frame forms a back wall of the slot.

FIG. 4 is a perspective view of the first station 4 wherein a support plate 4J of the frame 4A forms a back wall 4K of the slot 4B. The support plate extends above the slot 4B to increase stability of a supported computer 2. The slot 4B is shaped to accept a plurality of carriages 8 (not shown), each carriage 8 adapted to removably and alternately couple with an individual plug 4C & 4D, and to allow the plugs 4C & 4D to be manually positioned within the slot 4B and along the X axis. Alternatively, additionally or optionally, one or more plugs 4C & 4D may be shaped to reside stably within the slot 4B and without coupling with a carriage 8. Compartment 4N is detachable from the frame 4A and can be used to store carriages 8. Additional slots (not shown) similar to the slot 4B could optionally be added in different locations. For example, an additional slot could be added perpendicular to the slot 4B on either the right or left side of back wall 4J.

Figure 5:
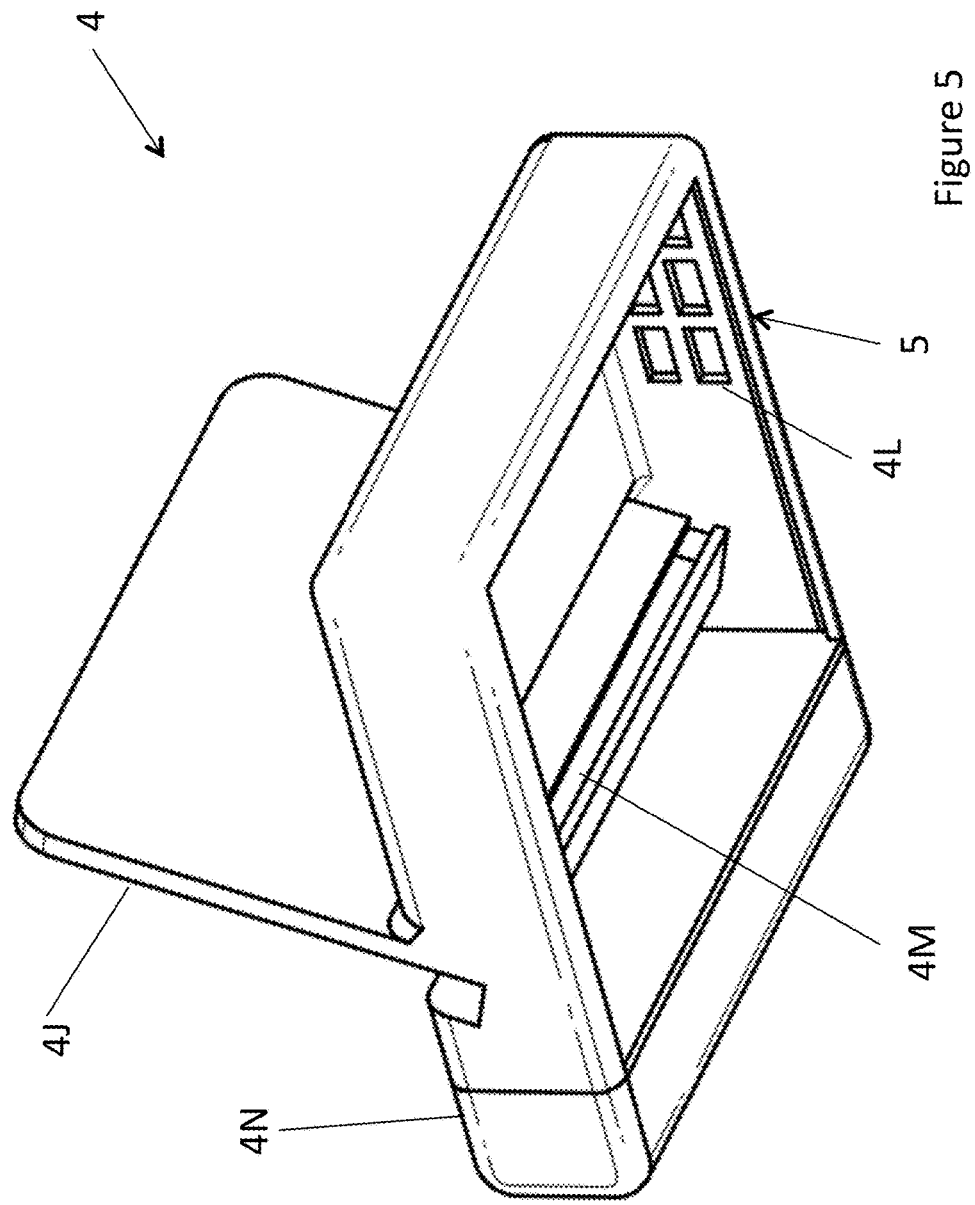
FIG. 5 is a perspective underside view of the frame, wherein a plurality of connector apertures comprising the outlet bank and a cable aperture of the frame are depicted.

FIG. 5 is a perspective underside view of the frame 4A, wherein a plurality of connector apertures 4L comprising the outlet bank 5 and a cable aperture 4M of the frame 4A are depicted. The cable aperture 4M is formed along the X axis on the rear side of the slot 4B and permits cables 4G & 4I to extend from (a) each of one or more plugs 4C & 4D and/one or more carriages 8 while the plugs 4C & 4D and/or carriages 8 are positioned within the slot 4B, and (b.) to dock connectors 4F & 4H that are each preferably separately coupled with connector apertures 4L to form the outlet bank 5.

Figure 6:
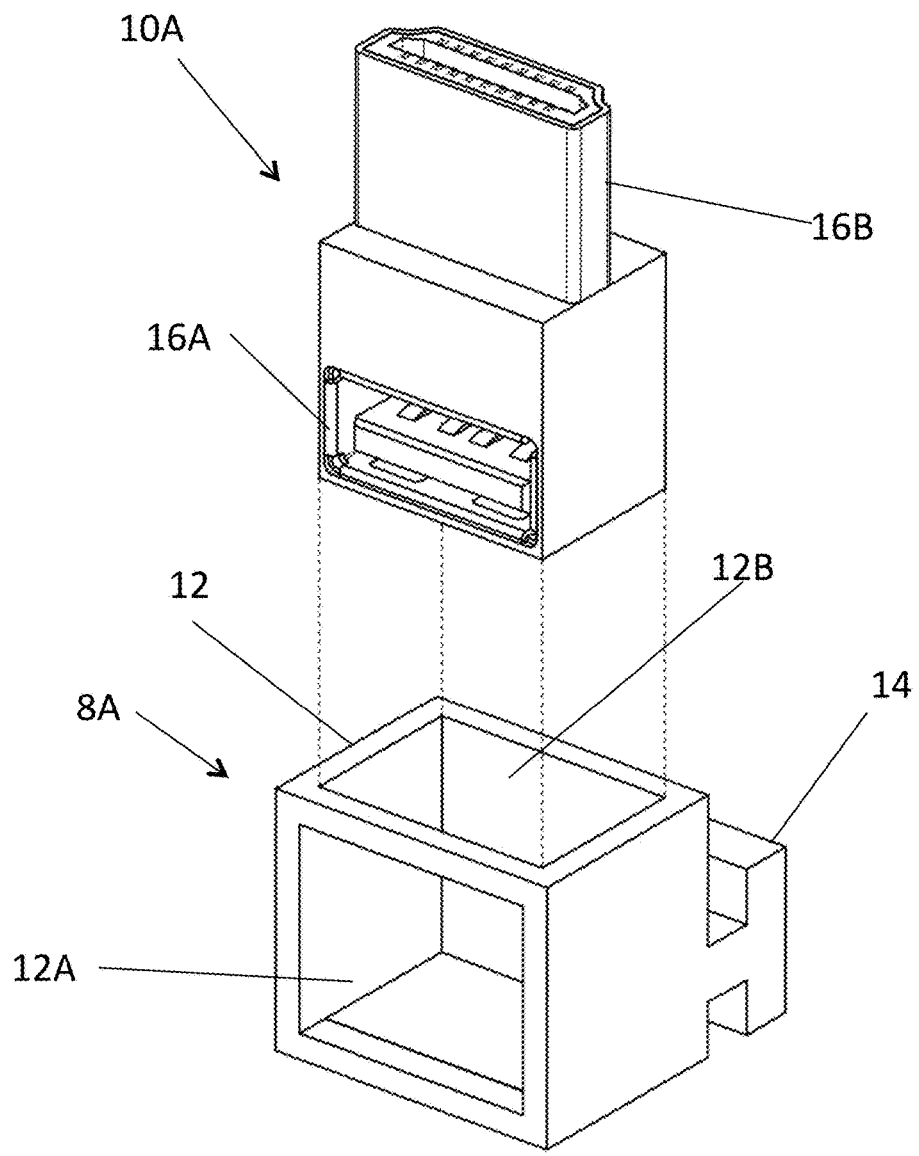
FIG. 6 is a perspective view of a first carriage with plug adapter.

FIG. 6 is a perspective view of a first carriage 8A with plug adapter 10A. First carriage 8A consists of a frame 12 configured to be slideably be received by slot 4B and a flange 14 to secure the carriage 8A into slot 4B. The frame 12 of carriage 8A is a hollow box with two open faces, a first open face 12A, faces the cable aperture 4M when inserted into slot 4B, while the second open face 12B, faces up towards where a computer 2 would rest. Plug adapter 10A fits, flush into the hollow space in the frame 12 of carriage 8A. The plug adapter 10A has a female end 16A and a male end 16B. When inserted, the female end 16A of plug adapter 10A faces towards the cable aperture 4M and the male end 16B faces up to mate with a computer 2. Mating with the female end 16A would either be a cable 4G or 4I which either attaches to a connector 4L of the outlet bank 5, or alternatively to internal circuitry 6 (to a USB controller 6b or an HDMI splitter 6C). There can be many different plug adapters 10A-Z (not shown), each may conform to an industry standard communications connector plug specification such as (a.) a Universal Serial Bus (hereinafter, "USB") connector specification, such the USB 1.0, USB 1.1, USB 2.0 or USB 3.0 receptacle specification; (b.) a High-Definition Multimedia Interface (hereinafter, "HDMI") connector specification, such as the HDMI Version 1.0, 1.2, 1.3 or 1.4; (c.) a suitable proprietary USB format such as the 30-pin plug marketed by Apple Inc. of Cupertino, Calif. or the 60-pin plug marketed by ASUSTek of Taipei, Taiwan; or (d.) other suitable electrical device communications and power connector specifications known in the art. Alternatively, rather than using a plug adapter 10, the cable 4G and 4I could simply be routed through the hollow space in the frame 12 of carriage 8A.

The first carriage 10A and the plug adapter 8A are reconfigurable elements of the docking station 4, wherein the first carriage 10A and the plug adapter 8a may (a.) be swapped out entirely and replaced with an alternate plug adapter or carriage; and/or (b.) reconfigured by replacing an element of the plug adapter 8A or first carriage 10A with an alternate element that supports a complementary configuration of the instant reconfigured male end 16B with an alternate connector standard.

Figure 7:
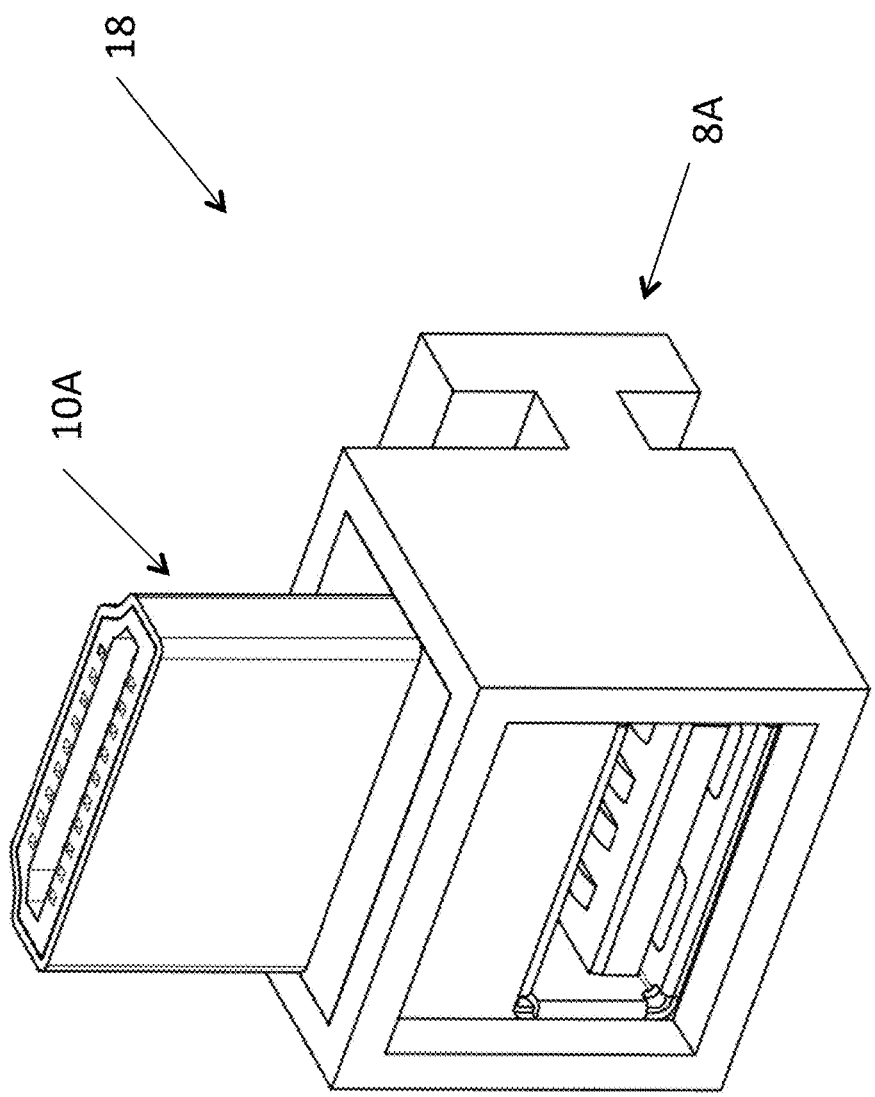
FIG. 7 is a depiction of plug adapter inserted into carriage.

FIG. 7 is a depiction of plug adapter 10A inserted into carriage 8A. When inserted, the result is a functional carriage 18.

Figure 8:
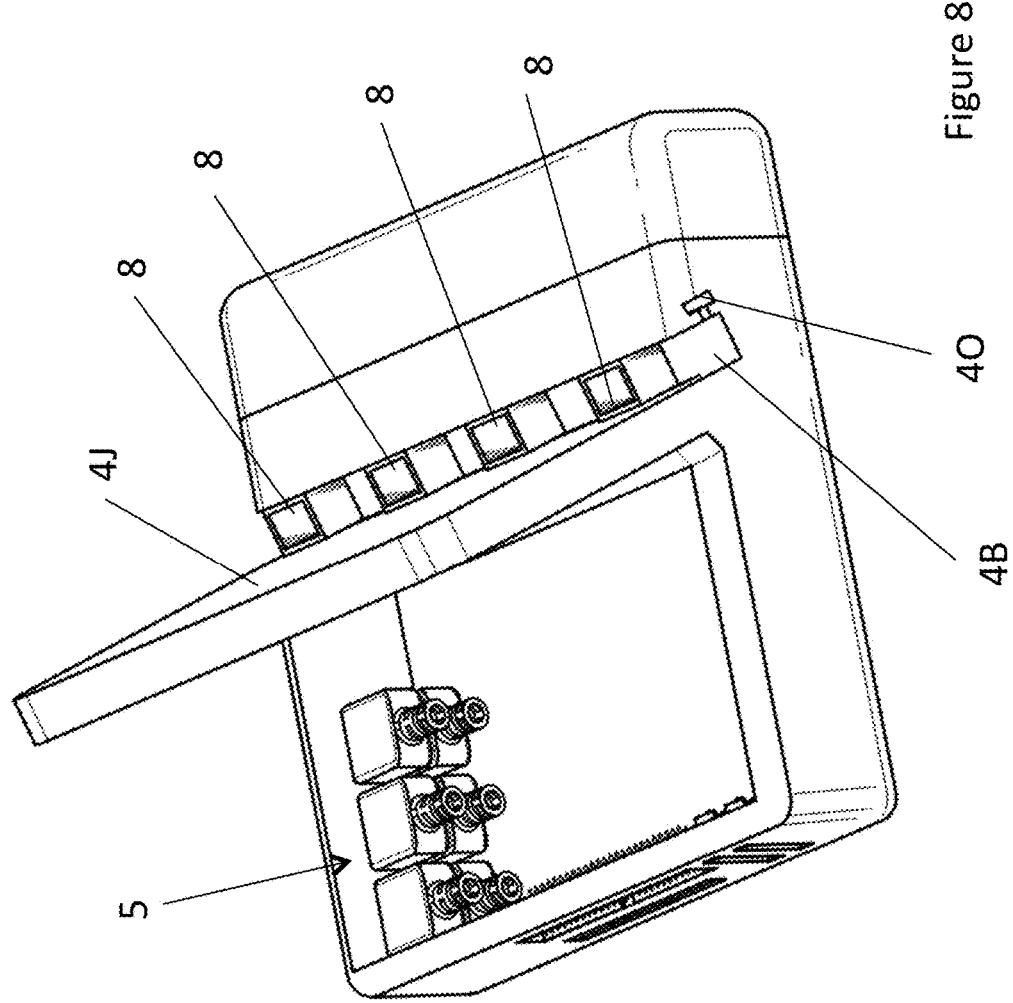
FIG. 8 is a perspective view of the first station of FIG. 2, including 4 carriages inserted into the slot.

FIG. 8 is a perspective view of the first station 4, including 4 carriages 8 inserted into slot 4B. Each of the carriages 8 is secured into place in the slot 4B by the flange 12 of carriages 8 that is received by a stabilization channel 4O of slot 4B.

Figure 9:
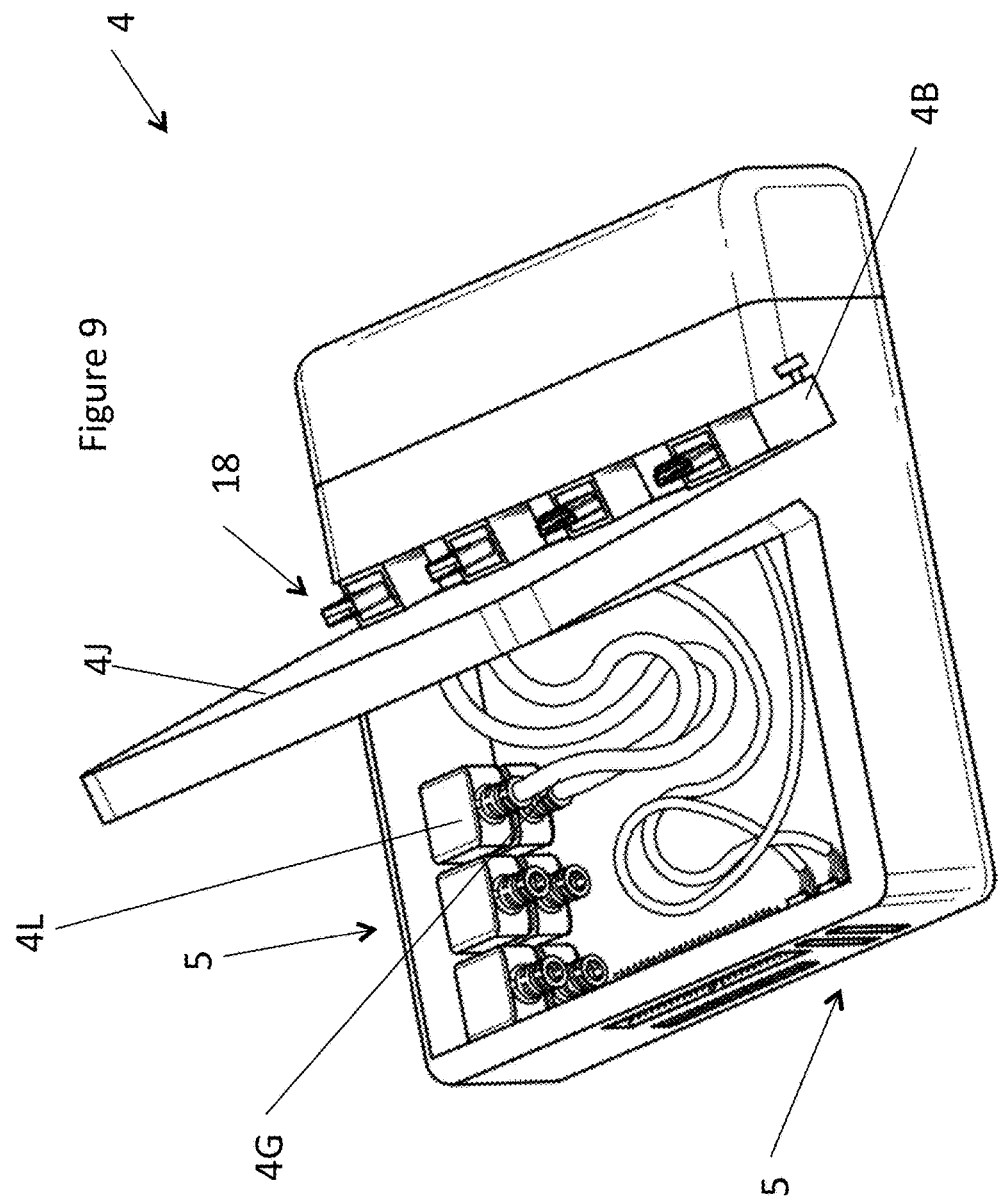
FIG. 9 is a perspective view of first station of FIG. 2 wherein the outlet bank is communicatively coupled to functional carriages.

FIG. 9 is a perspective view of first station 4 wherein outlet bank 5 is communicatively coupled to functional carriages 18. In this figure, cables 4G are directly connected to connectors 4L of the outlet bank 5, though in other embodiments cables would be routed through internal circuitry 6 (not shown) first such that a single functional carriage 18, plugged into a computer 2 would be able to communicate with multiple connectors 4L of outlet bank 5.

Figure 10:
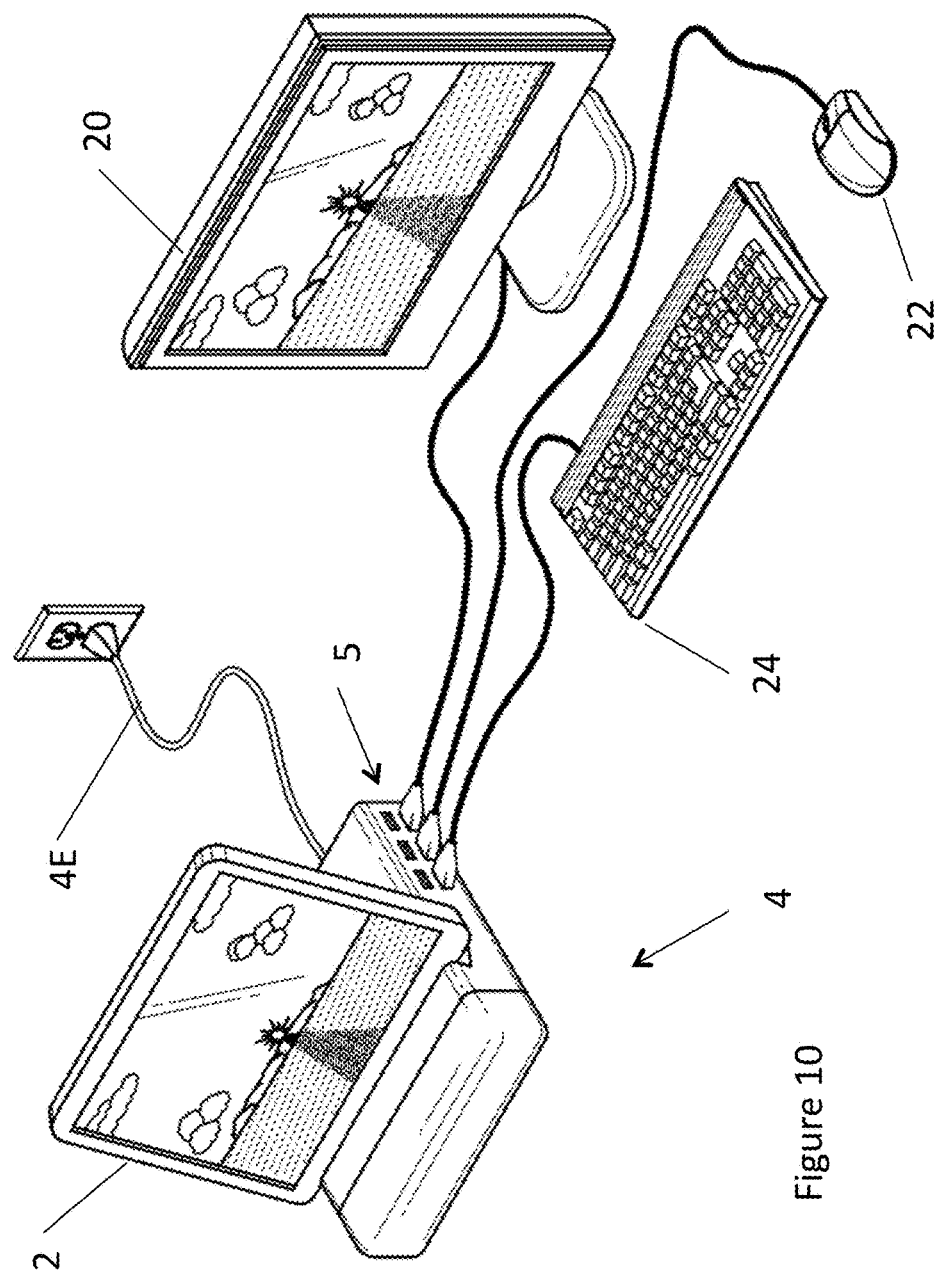
FIG. 10 is a perspective view of the first station of FIG. 2 in use.

FIG. 10 is a perspective view of the first station 4 in use. A computer 2 is placed on top of slot 4B, where functional carriages 18 (not shown) couple to connectors 2D and 2E of computer 2. Functional carriages 18 slide along the slot 4B to the necessary position to enable mechanical mating and enable electrical signal coupling with connectors 2D and 2E. Power cabling 4E connects to a wall outlet on one end and internal circuitry 6 on the other end and provides an electrical power pathway to the computer 2. Connected to the outlet bank 5 are one or more of peripherals, e.g., a monitor 20, a mouse 22, and/or a keyboard 24. In a sample configuration, the monitor 20 could be connected via an HDMI cable to the outlet bank 5, or could be connected via an UXGA cable, which is converted by the HDMI splitter 6C of the internal circuitry 6 to HDMI format such that it may connect to an HDMI port on the computer 2. Alternatively, any other suitable monitor format cabling could be accommodated in the outlet bank 5, as long as it could be converted by the internal circuitry 6 to a format compatible with the chosen computer 2. The mouse 22 and keyboard 24 could be connected to USB ports in the outlet bank 5. From the outlet bank 5, wiring would connect to a USB controller 6B and then to either connector 2D or 2E as appropriate. The peripherals 20, 22, 24 would then be used to operate the computer 2.

Figure 11:
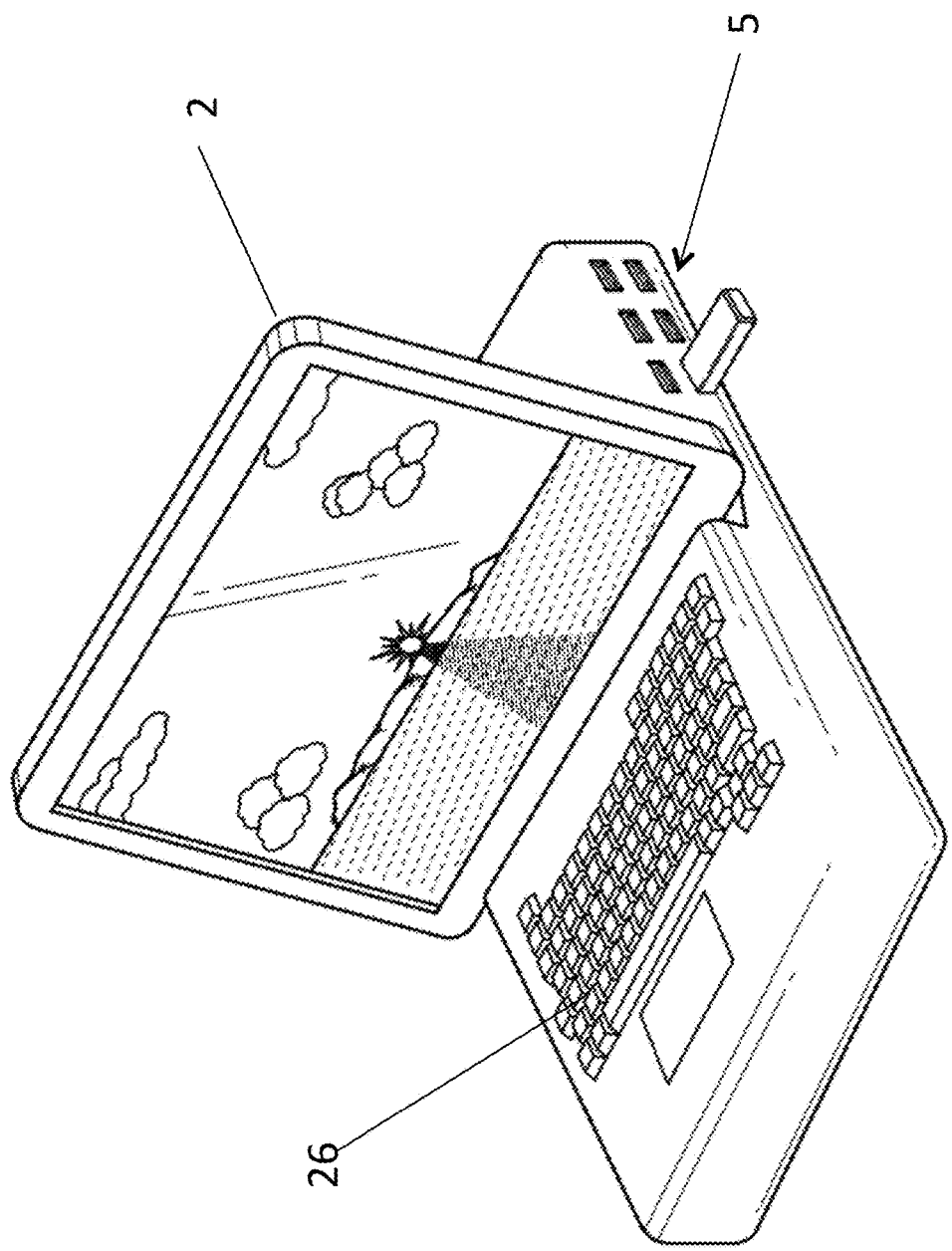
FIG. 11 is a perspective view of a docking station with an integrated keyboard and mouse pad.

FIG. 11 is a perspective view of a docking station with an integrated keyboard and mouse pad 26. In this embodiment, rather than all cabling 4G extending from USB controller 6B to various connectors 4L of the outlet bank 5, some would receive input from the integrated components 26.

Figure 12:
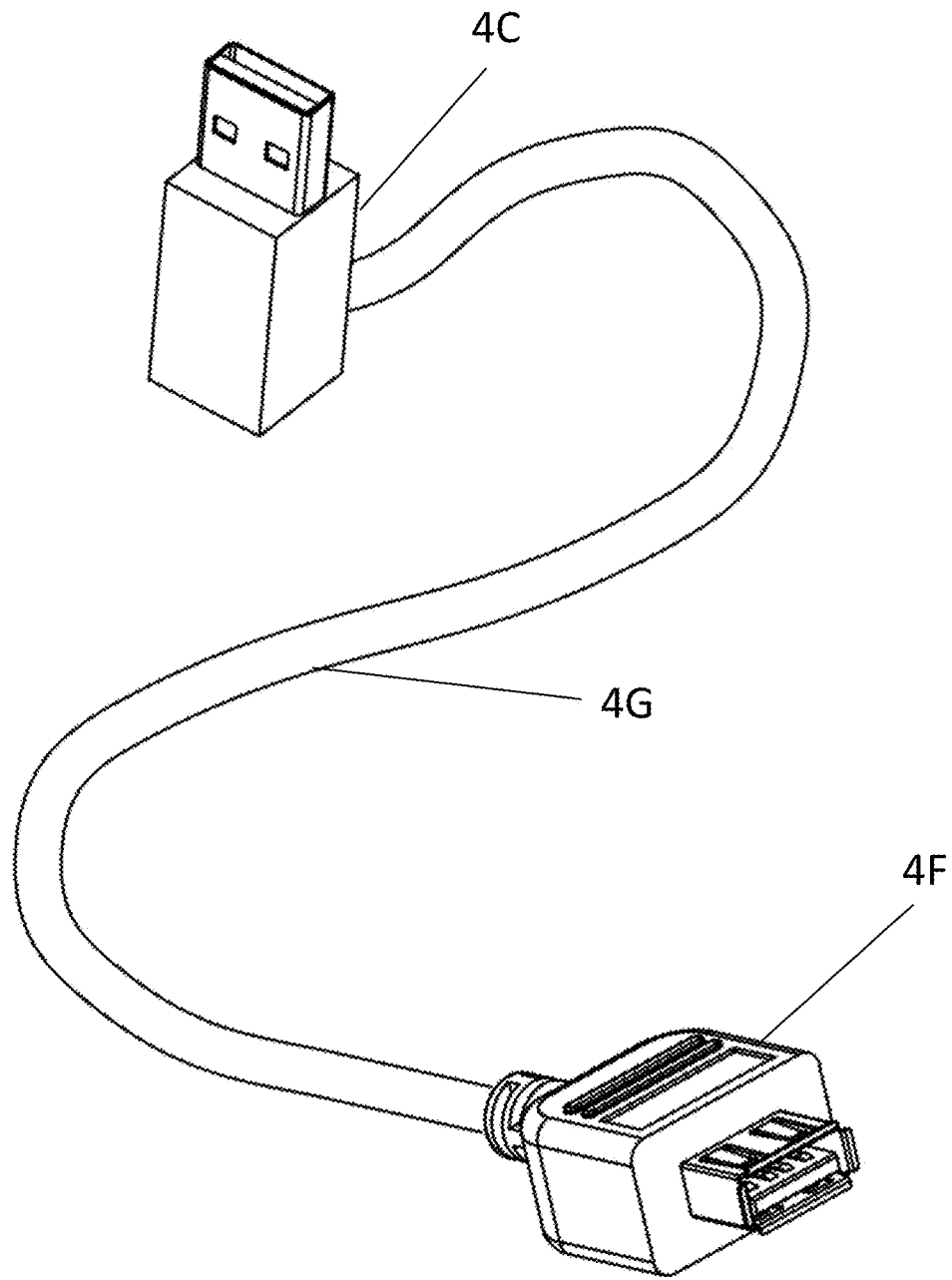
FIG. 12 is a perspective view of the first cable mechanically and electrically coupled with the first plug and the first dock connector.

FIG. 12 is a perspective view of the first cable 4G mechanically and electrically coupled with the first plug 4C and the first dock connector 4F. The first cable electrically couples the first plug and the first connector 4F. The first connector 4F is shaped, sized and adapted to be coupled with and extend through one of the connector apertures 4L of the frame 4A.

Figure 13:
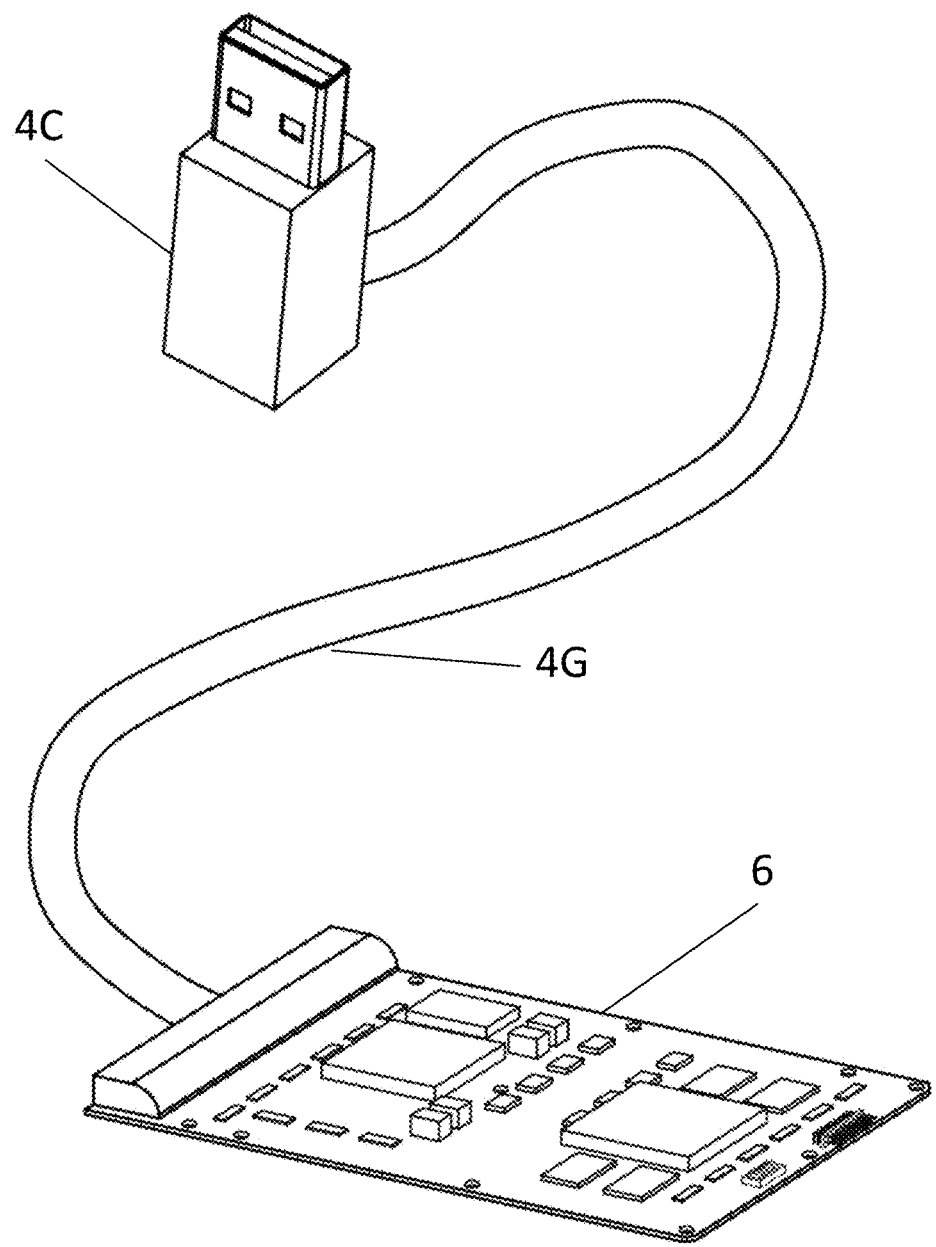
FIG. 13 is a perspective view of the first cable mechanically and electrically coupled with the first plug and the internal circuitry of FIG. 3.

FIG. 13 is a perspective view of the first cable 4G mechanically and electrically coupled with the first plug 4C and the internal circuitry 6. The first cable 4G electrically couples the first plug 4C and the internal circuitry 6. The internal circuitry 6 allows signals received by the first plug 4C to be split and signals sent to the first plug 4C to be compiled. The internal circuitry 6 may also allow power to be sent towards the first plug 4C.

Figure 14:
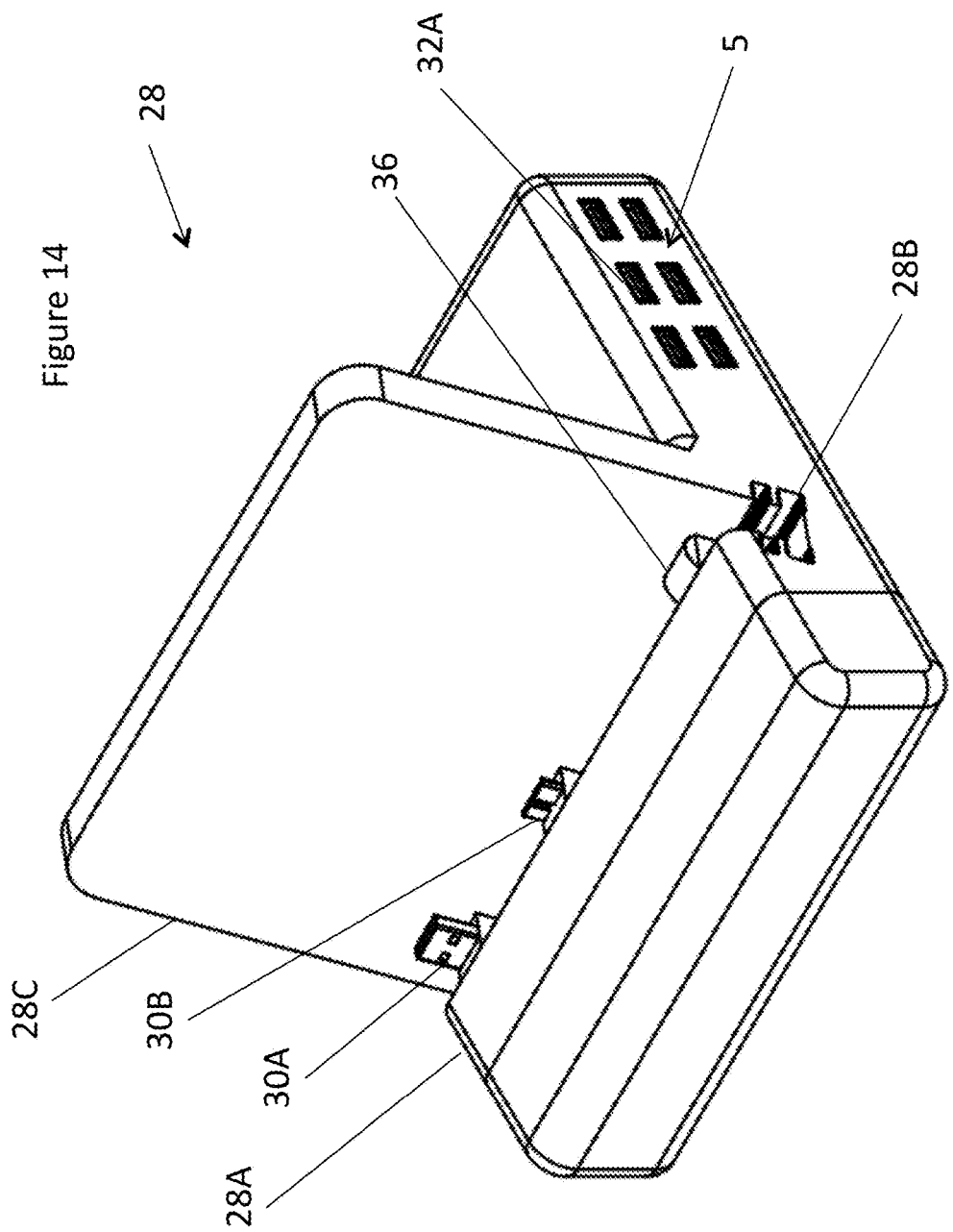
FIG. 14 is a front perspective view of a second preferred embodiment of the present invention.
Figure 17:
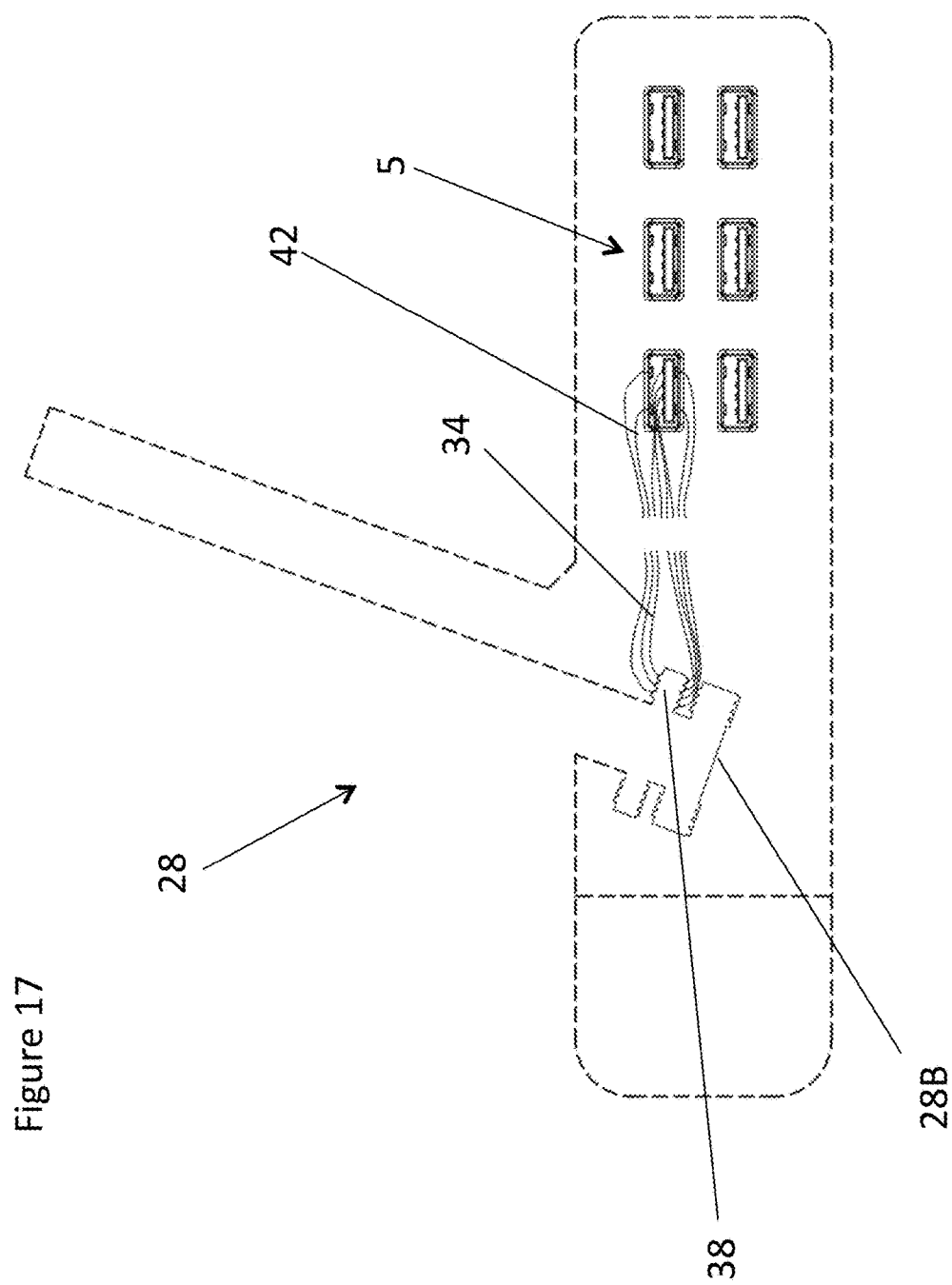
FIG. 17 is a transparent view a second station of FIG. 14 showing signal lines.

FIG. 14 is a front perspective view of a second preferred embodiment 28 of the present invention (hereinafter, "second station" 28) wherein a second frame 28A includes a second slot 28B, and a second support plate 28C. The second station 28 further comprises a plurality of plug assemblies 30A-30N, a plurality of dock connector receptacles 32A-32N, forming an outlet bank 5, and a plurality of signal lines 34 (as shown in FIG. 17). The second station 28 additionally, alternately or optionally includes a support block 36. The support block 36 is adapted with a cushion 16A and may be applied to reside within the second slot 28B and provide a resting and support point or location for the computer 2.

Each plug assembly 30A-30B may conform to an industry standard communications connector plug specification such as (a.) a Universal Serial Bus (hereinafter, "USB") connector specification, such the USB 1.0, USB 1.1, USB 2.0 or USB 3.0 receptacle specification; (b.) a High-Definition Multimedia Interface (hereinafter, "HDMI") connector specification, such as the HDMI Version 1.0, 1.2, 1.3 or 1.4; (c.) a suitable proprietary USB format such as the 30-pin plug marketed by Apple Inc. of Cupertino, Calif. or the 60-pin plug marketed by ASUSTek of Taipei, Taiwan; or (d.) other suitable electrical device communications and power connector specifications known in the art.

Each of the dock connector receptacles 32A-32N may conform to an industry standard communications connector receptacle or port specification such as (a.) a Universal Serial Bus (hereinafter, "USB") connector specification, such the USB 1.0, USB 1.1, USB 2.0 or USB 3.0 receptacle specification; (b.) a High-Definition Multimedia Interface (hereinafter, "HDMI") connector specification, such as the HDMI Version 1.0, 1.2, 1.3 or 1.4; or (c.) other suitable electrical device communications, audio/visual, and power connector specifications known in the art.

Figure 15:
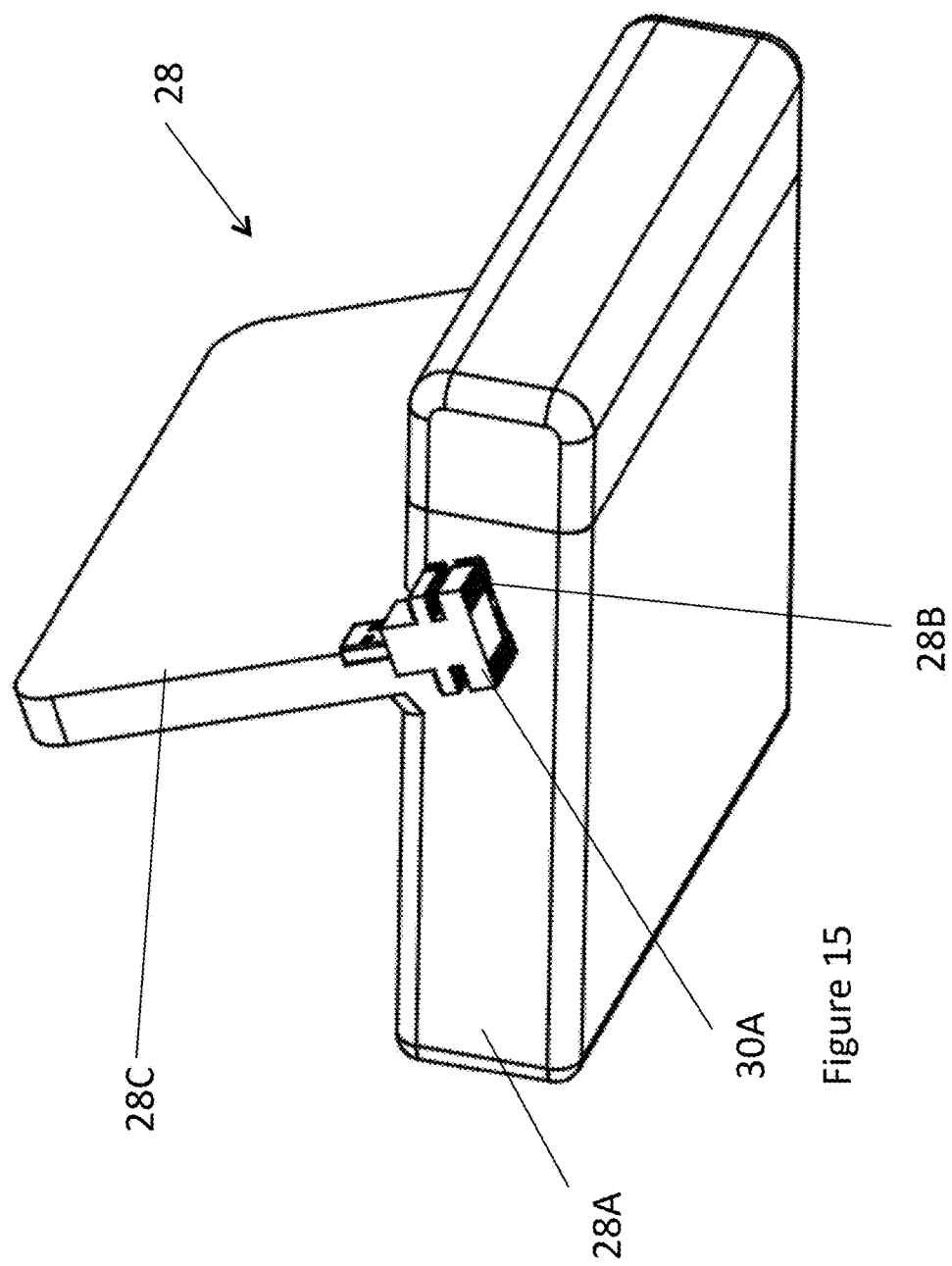
FIG. 15 is a side perspective view of the second station of FIG. 14 showing a USB plug positioned proximate to the second slot.

FIG. 15 is a side perspective view of the second station 28 and showing a USB plug 30A positioned proximate to the second slot 28B. The second slot 28B and the USB plug 30A are shaped, sized ad adapted to receive the USB plug 30A within the second slot 28B and permit the USB 30A to slide within the second slot 28B while maintaining electrical connection with a set of the power and signal lines 34.

Figure 16:
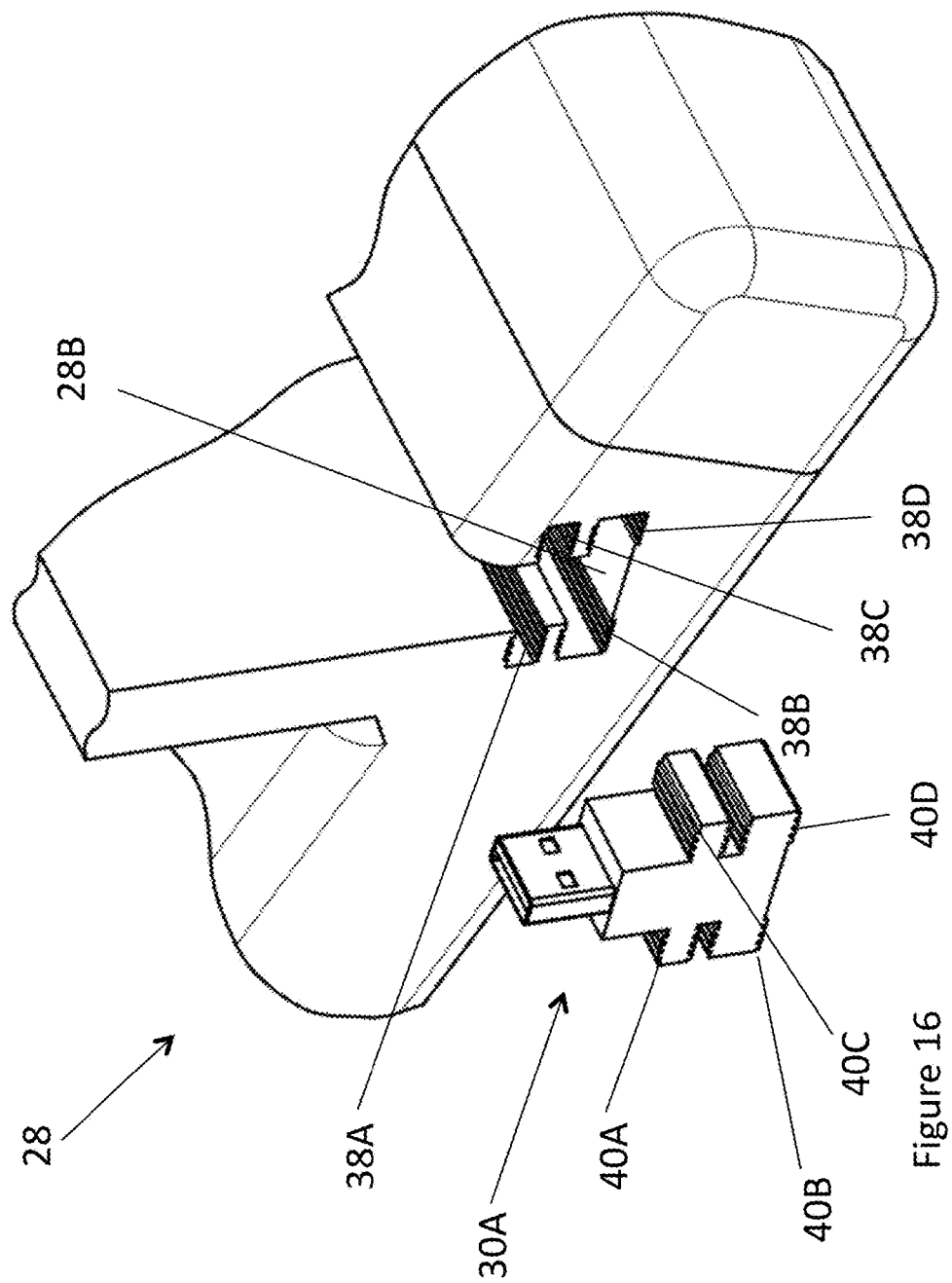
FIG. 16 is an exploded detail perspective illustration of a USB plug and a portion of the second slot of FIG. 14.

FIG. 16 is an exploded detail perspective illustration of a USB plug 30A and a portion of the second slot 28B. The plurality of signal and power lines 34A-34E each include a single terminal strip 38A-38D wherein each terminal strip 38A-38D is positioned within the second slot 28B to selectively enable unidirectional or bidirectional electrical connection with a particular electrically connective USB plug strip 40A-40D of the USB plug 30A.

It is understood that the number of plug strips 40 on plug 30 are variable based upon the type of plug used. For a USB plug 30A, there would be 4 plug strips 40A-D, because the USB standard used 4 pins. Each of the 4 pins in the plug itself would correspond to 4 particular terminal strips 38A-D, though the number of terminal strips 38 would not necessarily be limited to 4. For a different plug 30, such as an HDMI plug 30B (not shown); more plug strips 40 would be required and provided such that the 19 or 29 pins of the HDMI plug 30B each were represented. In other circumstances such as proprietary USB formats, additional or fewer plug strips 40 would correspond to whatever number of pins were used by the plug.

In the second slot 28B, there would be a plurality of terminal strips 38. The exact number would be greater than that of the number of plug strips 40 on whichever plug 30 had the most. This is to ensure that there are an adequate number of terminal strips 38 to electrically couple with every plug strip 40, even when multiple plugs 30 are placed in the second slot 28B. For illustrative purposes, one possible configuration would include 4 plug strips 40 on a USB plug 30A and 19 plug strips 40 on a HDMI plug 30B which would correspond to 23 terminal strips 38 in second slot 28B.

FIG. 17 is a transparent view of a second station 28 showing signal lines 34. Each terminal strip 38, running along the x-axis of the second station, within the second slot 28B has a corresponding signal line 34. There could potentially be hundreds of terminal strips 38 and corresponding signal lines 34, so long as there was one for each pin a user could potentially want to utilize on a computer 2. Each signal line 34 would either go directly to a receiver line 42 which would correspond to a pin in a dock connector receptacle 32, or alternatively to internal circuitry 6 (not shown). If the signal lines 34 are mechanically and communicatively coupled to internal circuitry 6, then the circuitry would facilitate either compiling or separating signals to receiver lines 42, allowing more dock connector receptacles 32 than the computer 2 had connectors 2D and 2E.

Figure 18:
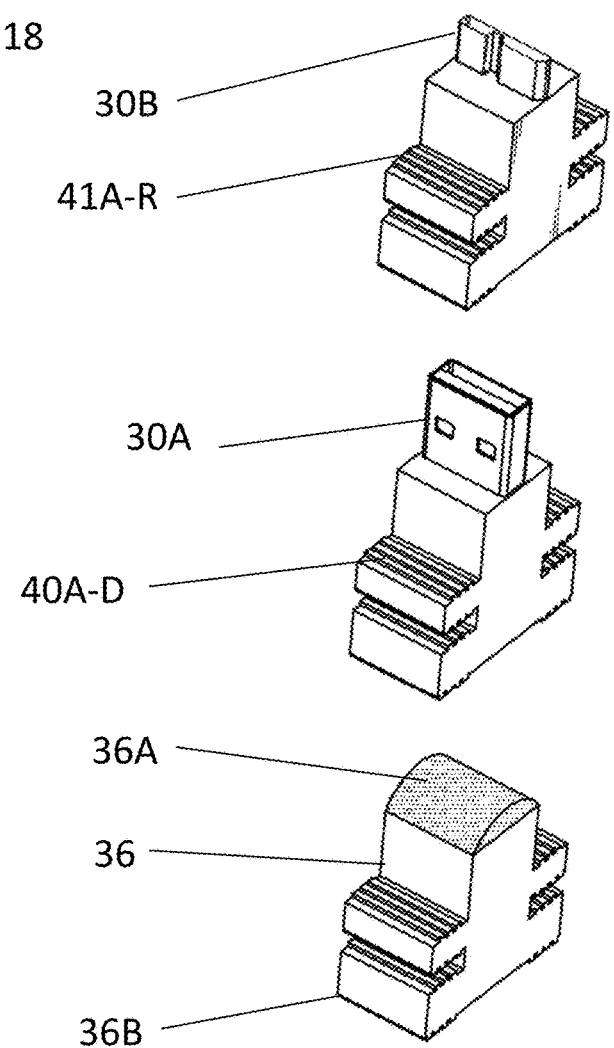
FIG. 18 is a perspective view of multiple plugs of the second station of FIG. 14.

FIG. 18 is a perspective view of multiple plugs 30 of the second station 28. Shown is an HDMI plug 30B that conforms to an HDMI standard plug specification. A plurality of HDMI plug strips 41A-41R, preferably nineteen in number, are each positioned on the HDMI plug 30B to uniquely electrically connect with one of nineteen terminal strips 38 of the second slot 28B. There are further nineteen HDMI power and signal lines 34 to enable signal and power transfer between an HDMI conforming connector 2D & 2E of the computer 2 and a first HDMI receptacle 32B of the second station 28. Also shown is the first USB plug 30A including the USB plug terminal strips 40A-40D that are each arranged along a USB plug 30A. Finally shown is a support block 36. The support block 36 is adapted with a cushion 36A and a plurality of support surfaces 36B. The support surfaces 36B are positioned to enable the support block 36 to reside within, and be slideably positioned within, the second slot 28B and to provide a resting and support point or location for the computer 2.

It is understood that plugs 30A-30B, 30C and 30D are reconfigurable plugs and that reconfiguration is achieved by swapping out and replacing one plug 30A-30D with another plug 30A-30D within the second slot 28B.

Figure 19:
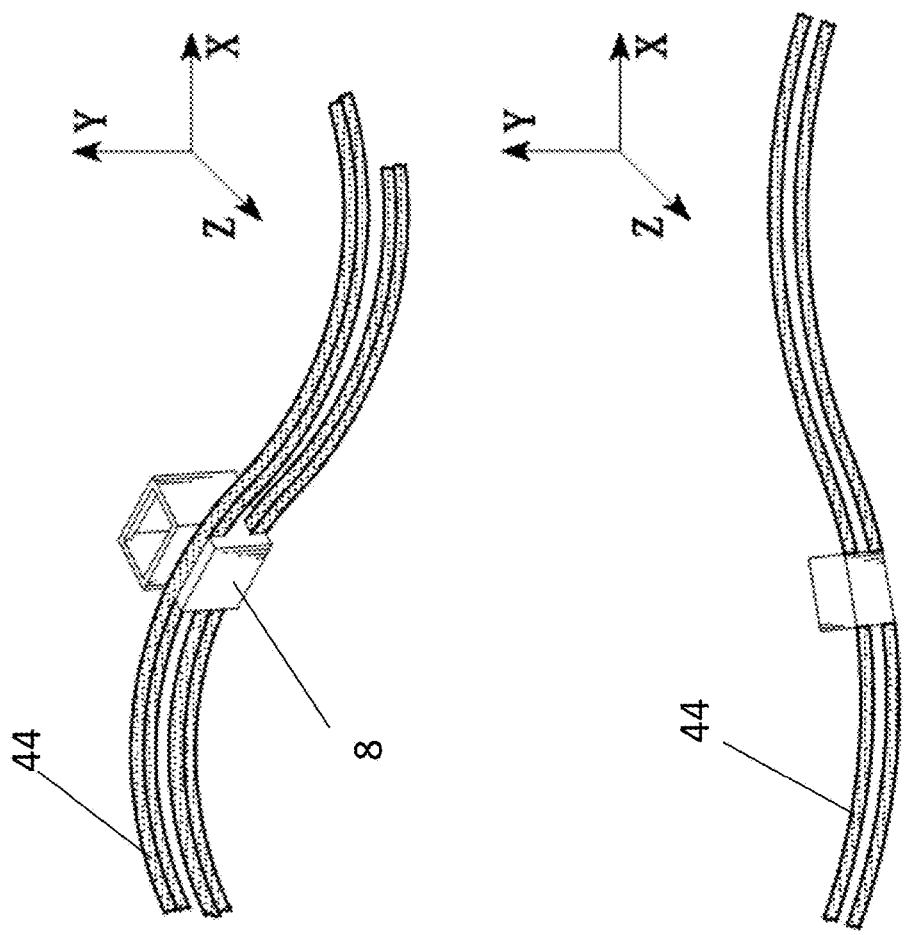
FIG. 19 is a depiction of bent terminal strips of the second station of FIG. 14.

FIG. 19 is a depiction of bent terminal strips 44. Terminal strips 38 running along the X-axis can be bent either to form convex or concave shapes in relation to either the Y or Z-axis. Carriages 8 of various types may slide along the terminal strips 38 or a slot 28B containing terminal strips 38. As such slots 28B of different shapes can be made as suitable to adapt to various portable computers 2.

Figure 20:
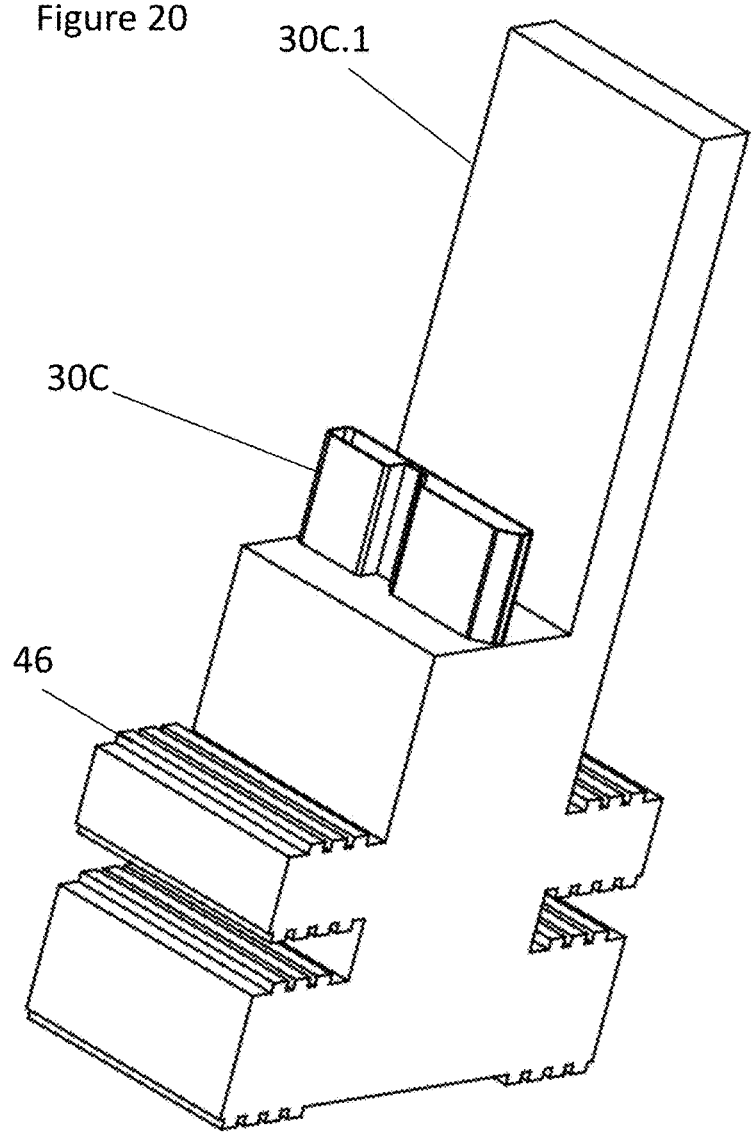
FIG. 20 is a detail perspective view of an alternative plug that is adapted for positioning with the second slot of FIG. 14 and electrical connectivity through the second slot.

FIG. 20 is a detail perspective view of an alternative plug 30C that is adapted for positioning with the second slot 28B and electrical connectivity through the second slot 28B. The alternative plug 30C comprises a plug support extension 30C.1 that extends away from the support surfaces 46 and provides mechanical support to the computer 2 when the alternative plug 30C is positioned within the second slot 28B.

Figure 21:
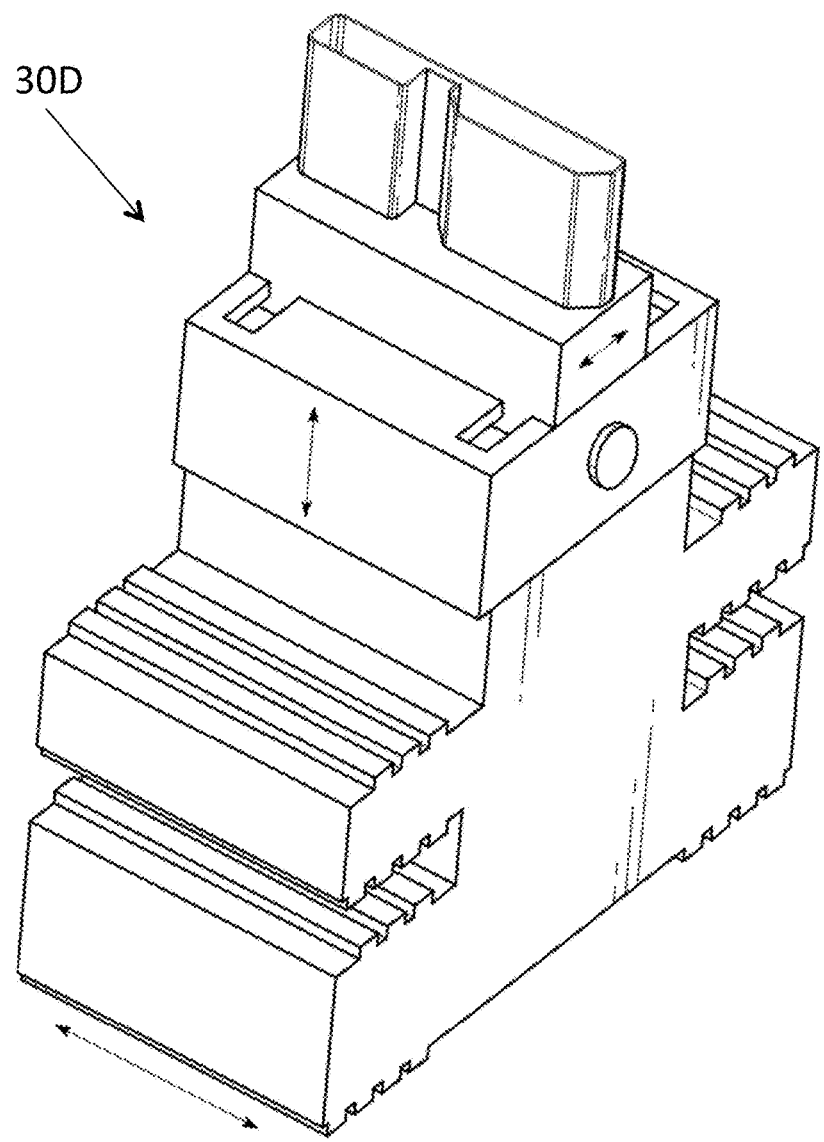
FIG. 21 is a detail perspective view of a second alternative plug that is adapted for positioning with the second slot of FIG. 14 and electrical connectivity through the second slot.

FIG. 21 is a detail perspective view of a second alternative plug 30D that is adapted for positioning with the second slot 28B and electrical connectivity through the second slot 28B. The second alternative plug 30D comprises a tower assembly that enables positioning of the HDMI insertion plug along a Y axis and a Z axis that are each mutually orthogonal and orthogonal to the X axis when the second alternative HDMI plug 30D is positioned within the second slot 28B.

Figure 22:
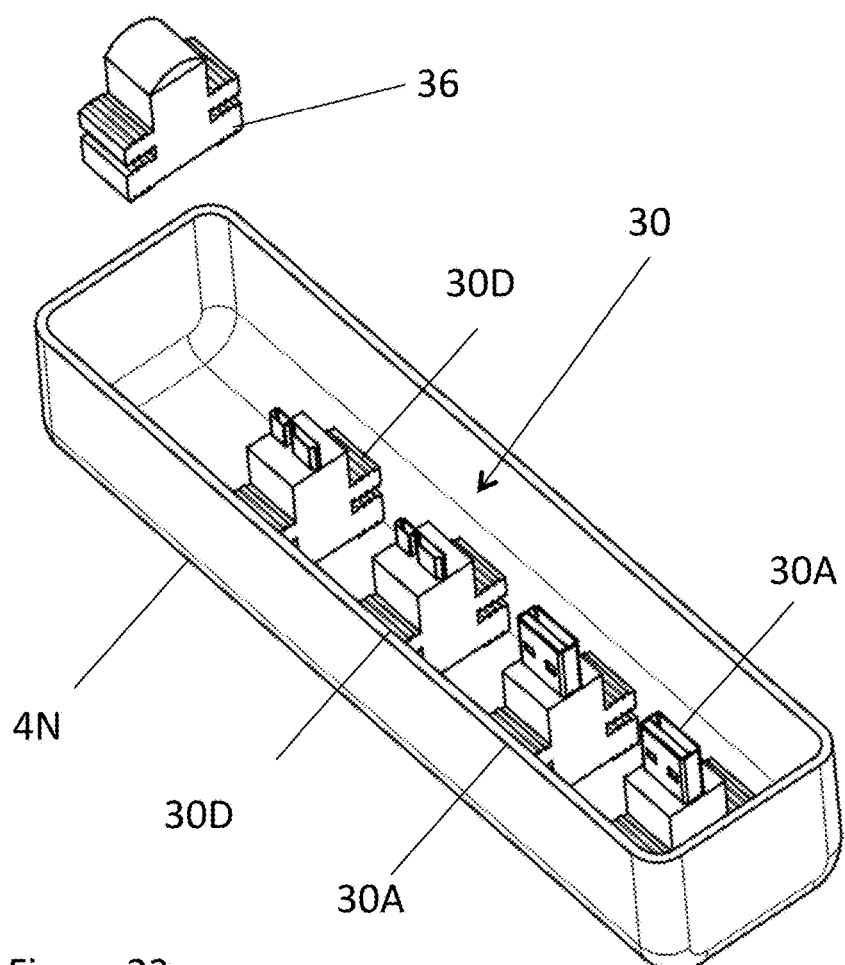
FIG. 22 is a back perspective view of the plug housing of FIG. 4.

FIG. 22 is a back perspective view of the plug housing 4N. The plug housing 4N is shaped, sized and adapted to enclose and protect a plurality of plugs 4C & 4D and/or carriages 8, 30.

Figure 23:
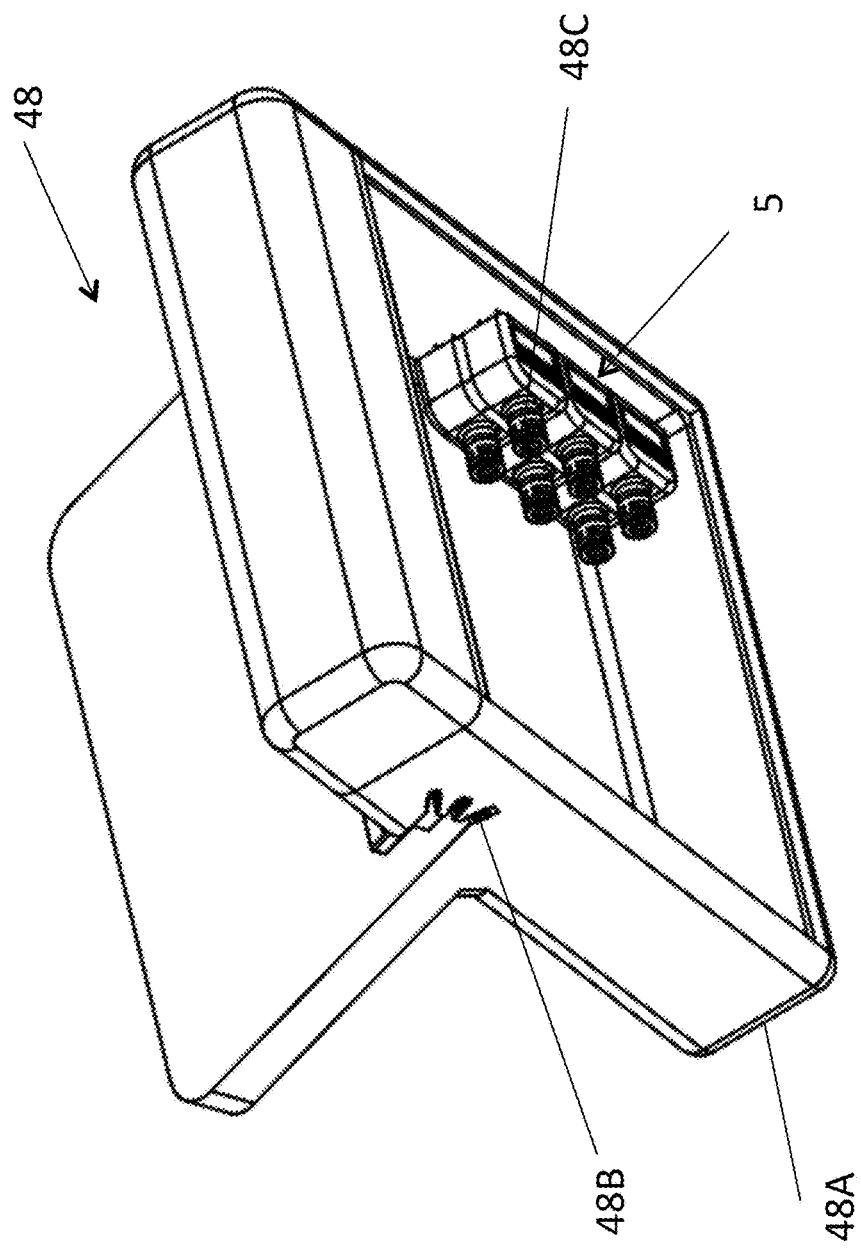
FIG. 23 is a perspective under view of a third frame of a third alternate preferred embodiment, with an alternate slot cross-section.

FIG. 23 is a perspective under view of a third frame 48A of a third alternate preferred embodiment 48 of the present invention (hereinafter, "the third station" 48), wherein the third frame 48A includes a third slot 48B having an alternate cross section relative to the X axis. The third station 48 further includes a plurality of connector receptacles 48C-48H forming an outlet bank 5. Each receptor connector 48C-48H may conform to an industry standard communications connector receptacle or port specification such as (a.) a Universal Serial Bus (hereinafter, "USB") connector specification, such the USB 1.0, USB 1.1, USB 2.0 or USB 3.0 receptacle specification; (b.) a High-Definition Multimedia Interface (hereinafter, "HDMI") connector specification, such as the HDMI Version 1.0, 1.2, 1.3 or 1.4; or (c.) other suitable electrical device communications, audio/visual, and power connector specifications known in the art.

Figure 24:
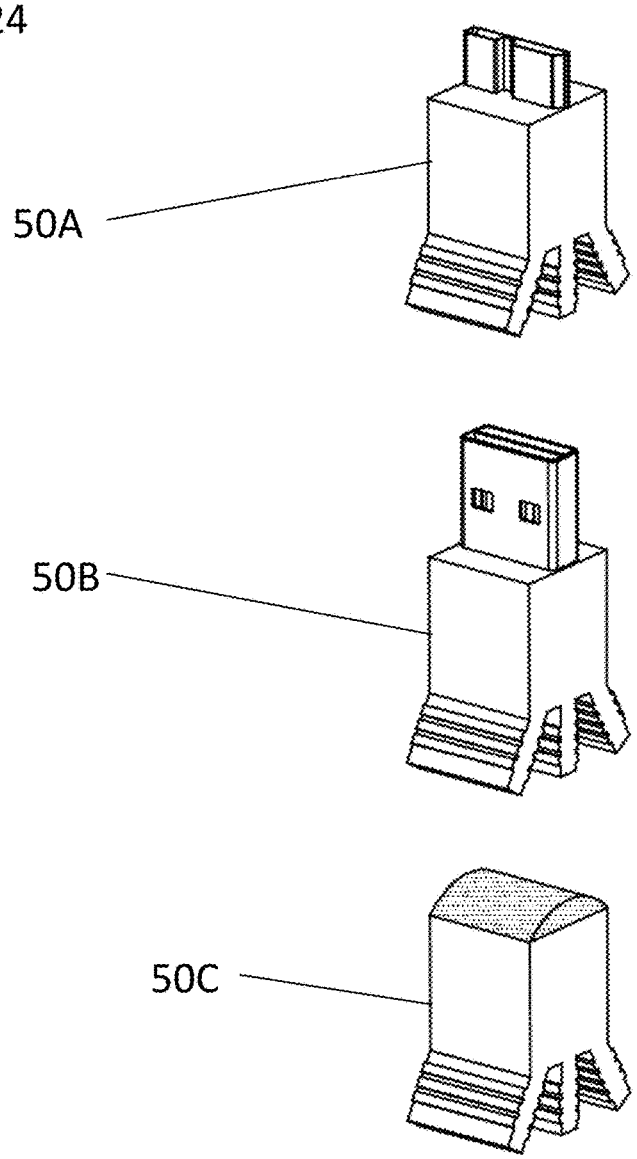
FIG. 24 is a perspective view of multiple plugs for use with the third slot of FIG. 23.

FIG. 24 is a perspective view of multiple plugs for use with the third slot 48B. Each shown corresponds to a similar plug as shown in FIG. 18. Shown are an HDMI plug 50A, a USB plug 50B, and a support block 50C.

It is understood that plugs 50A, 50B and 50C are reconfigurable plugs and that reconfiguration is achieved by swapping out and replacing one plug 50A, 50B and 50C with another plug 50A, 50B and 50C within the second slot 48B.

FIG. 25 is perspective view of a fourth and fifth USB insertion plug 52 and 54. The fourth USB plug 52 is mounted on a tower assembly 56 that enables slideable positioning of the fourth USB insertion plug 52 along the Z-axis. The fifth USB insertion plug 54 is mounted on a rotatable assembly 58 that enables rotational positioning of the fifth USB insertion plug 54 rotationally about the Z-axis. Each of these variations 52 and 54 may be affixed to any other suitable plug here disclosed to provide necessary adjustment capability.

Figure 26:
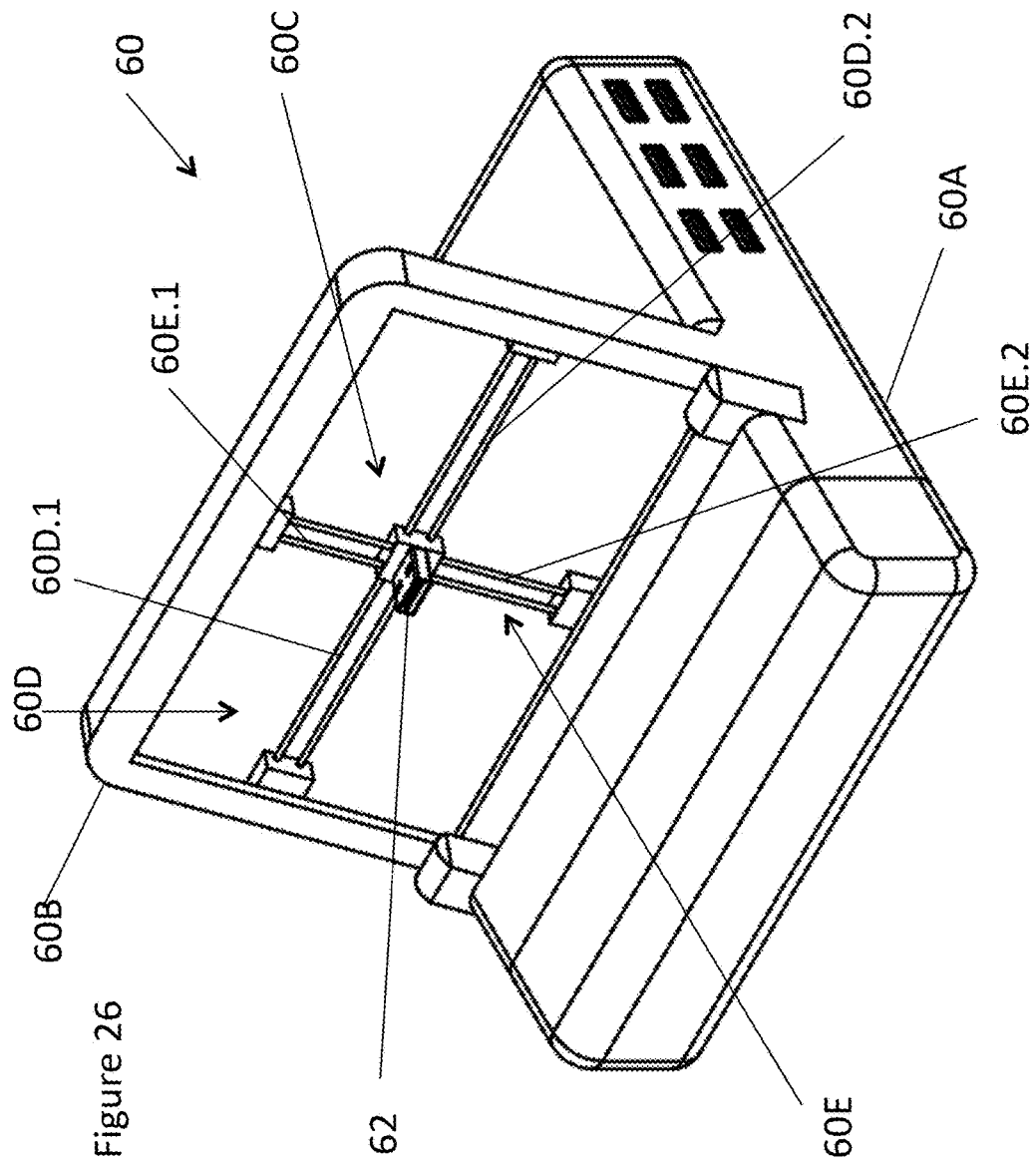
FIG. 26 is a perspective view of a fourth preferred embodiment that includes a two-dimensional positioning assembly.

FIG. 26 is a perspective view of a fourth preferred embodiment 60 of the present invention (hereinafter, "the fourth station" 60) that includes a fourth frame 60A having a fourth support plate 60B and a two-dimensional positioning assembly 60C. The positioning assembly 60C includes a first axis assembly 60D and a second axis assembly 60E that are each slideably positionable in orthogonal dimensions within the fourth support plate 60B. A first pair of rails 60D.1 & 60D.2 of the first axis assembly 60D extends through a back USB plug 62. A second pair of rails 60E.1 & 60E.2 of the second axis assembly 60E extends through the back USB plug 62 in an orientation orthogonal to the first pair of rails 60D.1 & 60D.2. Signal lines 34 pass from the back USB plug 62 through one or more rails 60D.1, 60D.2, 60E.1 & 60E.2.

Figure 27:
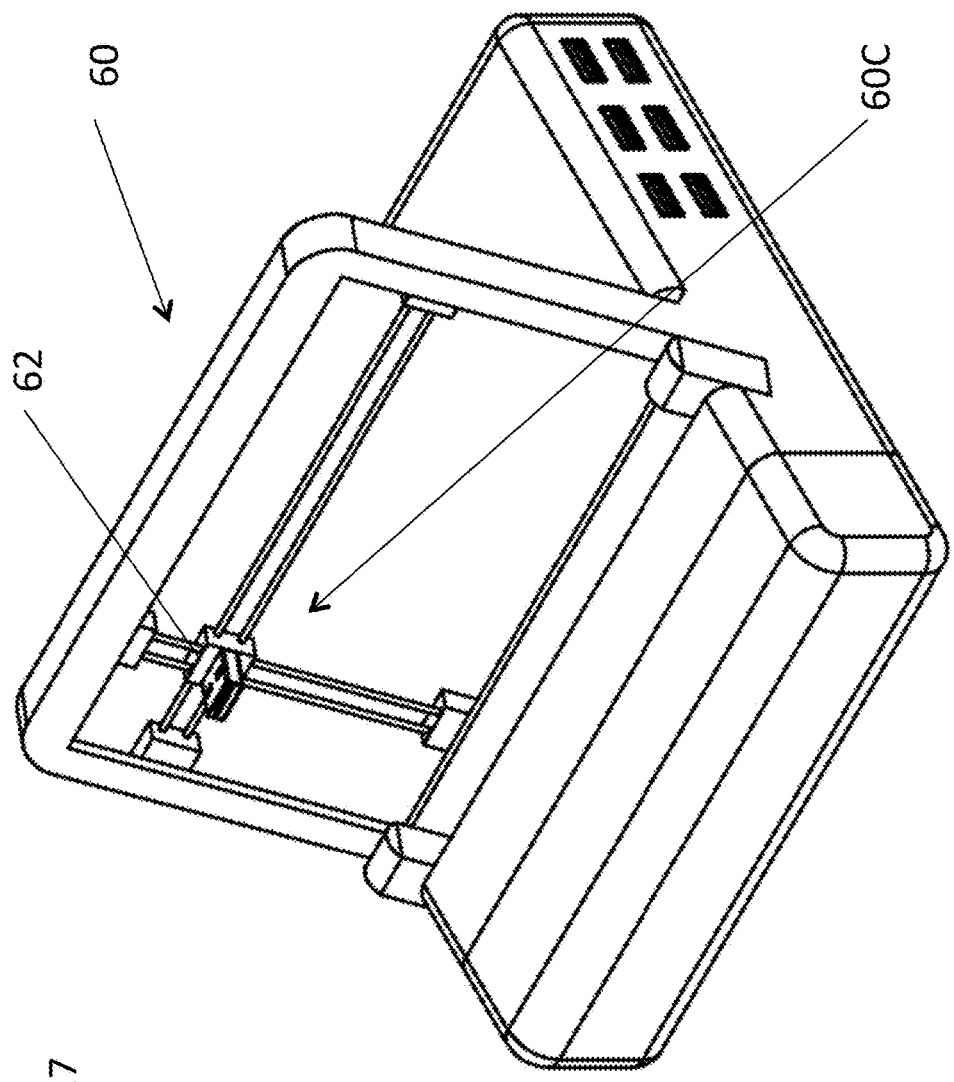
FIG. 27 is a perspective view of the fourth station of FIG. 26 with the back USB plug positioned by the positioning assembly in an upper left location.

FIG. 27 is a perspective view of the fourth station 60 with the back USB plug 62 positioned by the positioning assembly 60C in an upper left location.

Figure 28:
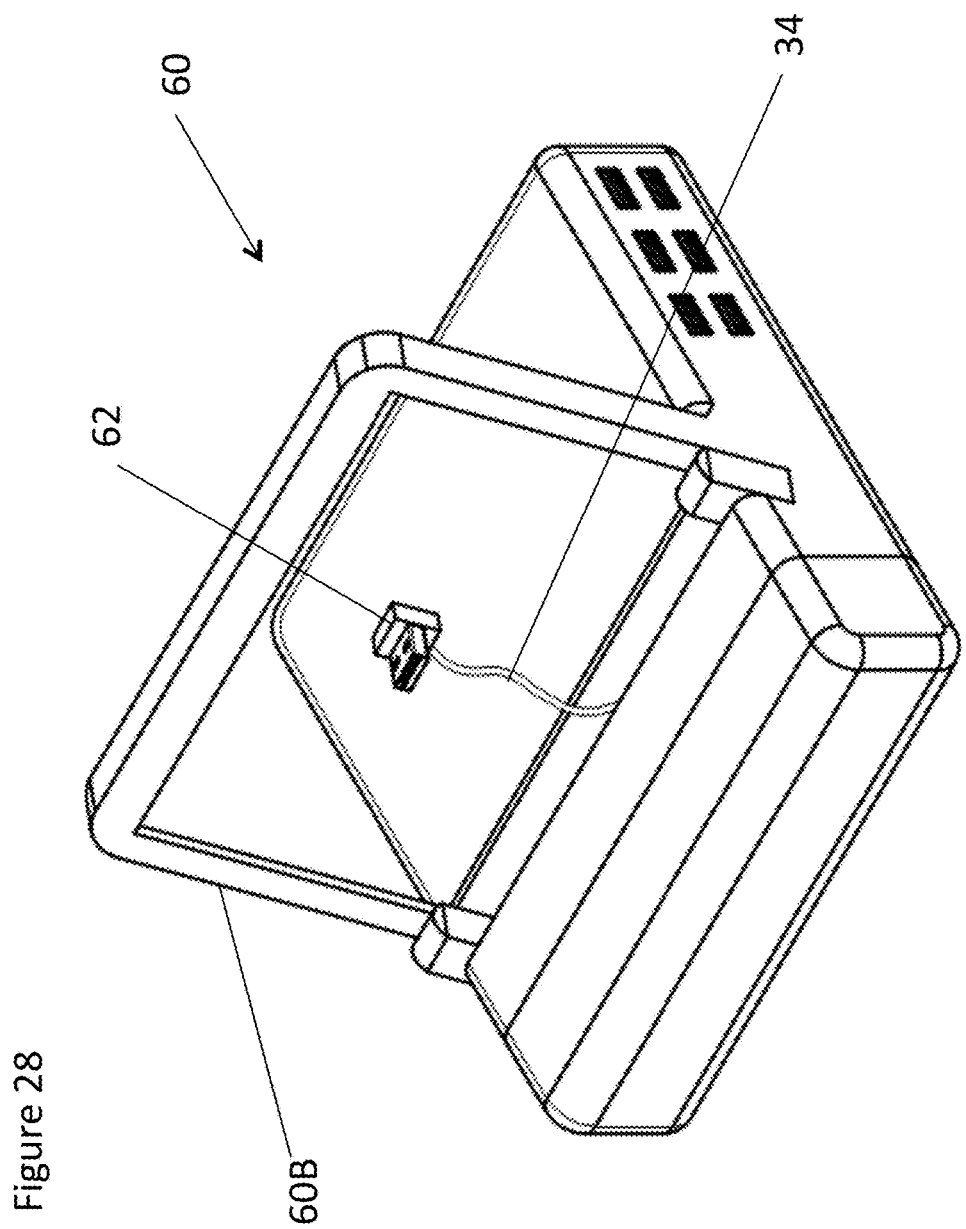
FIG. 28 is a transparent view of the fourth support plate of the fourth station of FIG. 26.

FIG. 28 is a transparent view of the fourth support plate 60B of the fourth station 60. A signal line 34 is contained within one of the rails 60D.1, 60D.2, 60E.1, or 60E.2 which provides data and power transfer for the USB plug 62.

Figure 29:
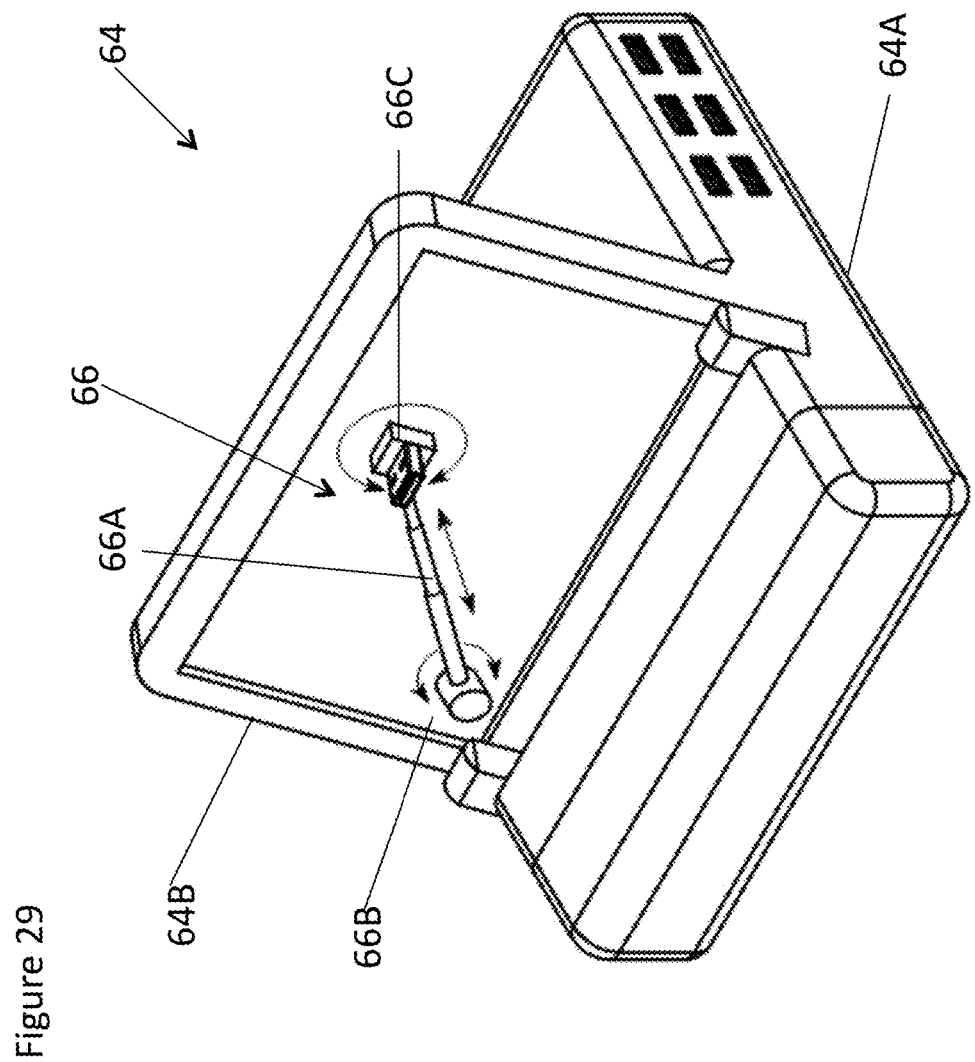
FIG. 29 is a perspective view of a fifth preferred embodiment with a rotating and telescoping USB plug.

FIG. 29 is a perspective view of a fifth preferred embodiment 64 of the present invention (hereafter "fifth station") with a rotating and telescoping USB plug 66. The fifth station 64 includes a frame 64A, a support plate 64B, and a rotating and telescoping USB plug 66. The rotating and telescoping USB plug 66 includes a telescoping arm 66A, a base rotator 66B, and a distal rotator 66C. A signal line 34 (not shown) runs through the telescoping arm 66A to provide for signal and power transfer to the rotating and telescoping USB plug 66.

The foregoing disclosures and statements are illustrative only of the Present Invention, and are not intended to limit or define the scope of the Present Invention. The above description is intended to be illustrative and not restrictive. Although the examples given herein include many specificities, they are intended as illustrative of only certain possible configurations or aspects of the Present Invention. The examples given should only be interpreted as illustrations of some of the preferred configurations or aspects of the Present Invention and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. An adjustable transferor of electronic communications, for transmitting either or both data and power between a first device and a second device, comprising:
   a. a plurality of conductive rails, at least one rail of the plurality of conductive rails adapted to couple with and structurally support a plug and at least one second rail of the plurality of conductive rails extending perpendicular to the at least one rail;
   b. the plug, complementary to the first device, having a number of communicative pins, each communicative pin corresponding to a unique conductive rail wherein each pin provides a contact point for the plug to slidably position along the plurality of conductive rails simultaneous with the at least one rail of the plurality of conductive rails structurally supporting the plug, and the plug coupled with the at least one second rail; and
   c. a plurality of signal lines, the plurality of signal lines each having proximate and distal ends, the proximate end of the signals lines uniquely affixed to each of the conductive rails and the distal end being complementary to the second device.

2. The adjustable transferor of electronic communications of claim 1, further comprising an intermediate converter, the intermediate converter comprising a first intermediate plug and a first intermediate receptacle, the first intermediate plug and the first intermediate receptacle bi-directionally electrically coupled, wherein the first intermediate plug is adapted to be complementary to a communications receptacle of a device docking structure and the first intermediate receptacle is adapted to be complementary to the plug.

3. The adjustable transferor of electronic communications of claim 1, wherein the plurality of rails are arcuate and the plug is positionable along the plurality of arcuate rails and the at least one rail is substantively perpendicular to the at least one second rail at a point proximate to the plug.

4. The adjustable transferor of electronic communications of claim 1, further compromising at least one additional plug additionally complementary to the first device, and having a number of communicative pins, each communicative pin of the at least one additional plug corresponding to a unique conductive rail different from those corresponding to communicative pins of the plug, wherein each pin provides a contact point for the at least one additional plug to slidably position along the conductive rails.

5. The adjustable transferor of electronic communications of claim 4, wherein the signal lines corresponding to the conductive rails contacting the pins of the at least one additional plug are complementary to at least one additional device.

* * * * *